US008831932B2

(12) United States Patent
Feng et al.

(10) Patent No.: US 8,831,932 B2
(45) Date of Patent: Sep. 9, 2014

(54) SCALABLE AUDIO IN A MULTI-POINT ENVIRONMENT

(75) Inventors: Jinwei Feng, Woburn, MA (US); Peter L. Chu, Lexington, MA (US); Stephen Botzko, Reading, MA (US)

(73) Assignee: Polycom, Inc., San Jose, CA (US)

( * ) Notice: Subject to any disclaimer, the term of this patent is extended or adjusted under 35 U.S.C. 154(b) by 414 days.

(21) Appl. No.: 13/294,471

(22) Filed: Nov. 11, 2011

(65) Prior Publication Data

US 2012/0290305 A1    Nov. 15, 2012

Related U.S. Application Data

(63) Continuation-in-part of application No. 12/829,233, filed on Jul. 1, 2010, now Pat. No. 8,386,266.

(60) Provisional application No. 61/413,213, filed on Nov. 12, 2010.

(51) Int. Cl.
*G10L 11/04*    (2006.01)

(52) U.S. Cl.
USPC ............................ 704/207; 704/229; 704/504

(58) Field of Classification Search
USPC ......... 704/208, 210, 214, 215, 500–504, 207, 704/229, 230; 348/14.07
See application file for complete search history.

(56) References Cited

U.S. PATENT DOCUMENTS

| | | | |
|---|---|---|---|
| 5,414,795 A | 5/1995 | Tsutsui et al. | |
| 5,654,952 A | 8/1997 | Suzuki et al. | |
| 5,884,039 A | 3/1999 | Ludwig et al. | |
| 6,894,715 B2 * | 5/2005 | Henrikson | 348/14.07 |
| 6,952,669 B2 | 10/2005 | Hutchins | |
| 7,272,556 B1 * | 9/2007 | Aguilar et al. | 704/230 |
| 7,529,675 B2 | 5/2009 | Maes | |
| 2002/0007273 A1 | 1/2002 | Chen | |
| 2004/0196770 A1 | 10/2004 | Touyama et al. | |
| 2005/0027516 A1 | 2/2005 | Lee et al. | |

(Continued)

FOREIGN PATENT DOCUMENTS

| | | |
|---|---|---|
| EP | 1408679 A2 | 4/2004 |
| JP | HEI04-343591 | 11/1992 |

(Continued)

OTHER PUBLICATIONS

Notice of Grounds for Refusal in counterpart Korean Appl. 10-2012-7021111, dated Nov. 21, 2013.

(Continued)

*Primary Examiner* — Huyen X. Vo
(74) *Attorney, Agent, or Firm* — Wong, Cabello, Lutsch, Rutherford & Brucculeri, LLP

(57) ABSTRACT

Use of a scalable audio codec to implement distributed mixing and/or sender bit rate regulation in a multipoint conference is disclosed. The scalable audio codec allows the audio signal from each endpoint to be split into one or more frequency bands and for the transform coefficients within such bands to be prioritized such that usable audio may be decoded from a subset of the entire signal. The subset may be created by omitting certain frequency bands and/or by omitting certain coefficients within the frequency bands. By providing various rules for each endpoint in a conference, the endpoint can determine the importance of its signal to the conference and can select an appropriate bit rate, thereby conserving bandwidth and/or processing power throughout the conference.

49 Claims, 14 Drawing Sheets

(56) References Cited

U.S. PATENT DOCUMENTS

| | | | |
|---|---|---|---|
| 2005/0254440 | A1 | 11/2005 | Sorrell |
| 2007/0201549 | A1 | 8/2007 | Hannuksela et al. |
| 2007/0208557 | A1 | 9/2007 | Li et al. |
| 2008/0052068 | A1 | 2/2008 | Aguilar et al. |
| 2008/0097749 | A1 | 4/2008 | Xie et al. |
| 2008/0097755 | A1 | 4/2008 | Xie |
| 2009/0046580 | A1 | 2/2009 | Botzko et al. |
| 2009/0129576 | A1 | 5/2009 | Yamanashi et al. |
| 2009/0248424 | A1 | 10/2009 | Koishida et al. |
| 2010/0114567 | A1 | 5/2010 | Bruhn |
| 2011/0191111 | A1 | 8/2011 | Chu et al. |
| 2013/0066641 | A1* | 3/2013 | Bruhn .......................... 704/500 |

FOREIGN PATENT DOCUMENTS

| | | | |
|---|---|---|---|
| JP | HEI10-285043 | | 10/1998 |
| JP | 2001519552 | A | 10/2001 |
| JP | 2002215193 | A | 7/2002 |
| JP | 2005037949 | A | 2/2005 |
| JP | 2005215502 | A | 8/2005 |
| JP | 2005338850 | A | 12/2005 |
| JP | 2007025375 | | 2/2007 |
| JP | 2008089999 | A | 4/2008 |
| WO | 2006008932 | A1 | 1/2006 |
| WO | 2010/070187 | A1 | 6/2010 |

OTHER PUBLICATIONS

Int'l. Search Report in counterpart PCT Appl. No. PCT/US2011/060398, dated Mar. 16, 2012.

Written Opinion in counterpart PCT Appl. No. PCT/US2011/060398, dated Mar. 16, 2012.

Search History in counterpart PCT Appl. No. PCT/US2011/060398, date of search Mar. 8, 2012.

European Search Report in counterpart EP Appl. No. 11005379.0, dated Dec. 2, 2011.

Varga et al, "ITU-T G.729.1 Scalable Codec for New Wideband Services," IEEE Communications Magazine, vol. 47, No. 10, Oct. 1, 2009, pp. 131-137.

Notification of First Office Action in counterpart Japanese Appl. 2011-144349, dated Jan. 22, 2013.

Notification of First Office Action in counterpart Chinese Appl. 201110259741.8, dated Aug. 21, 2012.

Raad, M. et al., "Scalable Audio Coding Employing Sorted Sinusoidal Parameters," International Symposium on Signal Processing and its Application, Malaysia, Aug. 13-16, 2001, pp. 175-177.

Vinton, M. et al., "A Scalable and Progressive Audio Codec," IEEE Department of Electrical Engineering, University of Washington, pp. 3277-3280, 0-7803-7041-4/01, (c) 2001.

Koishida, K. et al., "A 16KBit/s Bandwidth Scalable Audio Coder Based on the G.729 Standard," 2000 IEEE international Conference on Acoustics, Speech, and Signal Processing, pp. II1149 -II1152 vol. 2, dated 2000.

Raad, M. et al., "Audio Coding Based on the Modulated Lapped Transform (MLT) and Set Partitioning in Hierarchical Trees," Proceedings of the 8th International Conference on Information Systems Analysis and Synthesis (ISAS '02), dated 2002.

Raad,"Audio Compression using the MLT and SPIHT," Proceedings of the 6th International Symposium on Digital Signal Processing for Communication Systems (DSPCS '02), pp. 128-131, Wollongong, Australia, dated 2002.

Raad,"Scalable to Lossless Audio Compression Based on Perceptual Set Partitioning in Hierarchical Trees (PSPIHT)," IEEE, School of Electrical, Computer and Telecommunications Engineering, University of Wollongong, Australia, pp. V-624 to V-627, 0-7803-7663-3/03, (c) 2003.

Response to First Office Action dated Feb. 23, 2012 in U.S. Appl. No. 12/829,233, filed Jul. 23, 2012.

Response filed in EP Appl. No. EP 11005379.0, dated Jul. 4, 2012.

First Office Action in copending U.S. Appl. No. 12/829,233, mailed Feb. 23, 2012.

Supplementary European Search Report in counterpart European Appl. 11 84 0587, dated Nov. 4, 2013.

First Office Action in counterpart Japanese Appl. P2013-510371, dated Feb. 4, 2014.

First Office Action in counterpart Taiwanese Appl. 100123209, dated Oct. 17, 2013.

* cited by examiner

SCALABLE AUDIO IN A MULTI-POINT ENVIRONMENT

CROSS-REFERENCE TO RELATED APPLICATIONS

This application is a continuation-in-part of U.S. application Ser. No. 12/829,233, filed 1 Jul. 2010, and claims the benefit of U.S. Provisional Appl. No. 61/413,213, filed 12 Nov. 2010, which are both incorporated herein by reference.

BACKGROUND

Many types of systems use audio signal processing to create audio signals or to reproduce sound from such signals. Typically, signal processing converts audio signals to digital data and encodes that data for transmission over a network. Then, additional signal processing decodes the transmitted data and converts it back to analog signals for reproduction as acoustic waves.

Various techniques exist for encoding or decoding audio signals. (A processor or a processing module that encodes and decodes a signal is generally referred to as a codec.) Audio codecs are used in conferencing to reduce the amount of data that must be transmitted from a near-end to a far-end to represent the audio. For example, audio codecs for audio and video conferencing compress high-fidelity audio input so that a resulting signal for transmission retains the best quality but requires the least number of bits. In this way, conferencing equipment having the audio codec needs less storage capacity, and the communication channel used by the equipment to transmit the audio signal requires less bandwidth.

Audio codecs can use various techniques to encode and decode audio for transmission from one endpoint to another in a conference. Some commonly used audio codecs use transform coding techniques to encode and decode audio data transmitted over a network. One type of audio codec is Polycom's Siren codec. One version of Polycom's Siren codec is the ITU-T (International Telecommunication Union Telecommunication Standardization Sector) Recommendation G.722.1 (Polycom Siren 7). Siren 7 is a wideband codec that codes the signal up to 7 kHz. Another version is ITU-T G.722.1.0 (Polycom Siren 14). Siren14 is a super wideband codec that codes the signal up to 14 kHz.

The Siren codecs are Modulated Lapped Transform (MLT)-based audio codecs. As such, the Siren codecs transform an audio signal from the time domain into a Modulated Lapped Transform (MLT) domain. As is known, the Modulated Lapped Transform (MLT) is a form of a cosine modulated filter bank used for transform coding of various types of signals. In general, a lapped transform takes an audio block of length L and transforms that block into M coefficients, with the condition that L>M. For this to work, there must be an overlap between consecutive blocks of L-M samples so that a synthesized signal can be obtained using consecutive blocks of transformed coefficients.

FIGS. 1A-1B briefly show features of a transform coding codec, such as a Siren codec. Actual details of a particular audio codec depend on the implementation and the type of codec used. For example, known details for Siren 14 can be found in ITU-T Recommendation G.722.1 Annex C, and known details for Siren 7 can be found in ITU-T Recommendation G.722.1, which are incorporated herein by reference. Additional details related to transform coding of audio signals can also be found in U.S. patent application Ser. Nos. 11/550,629 and 11/550,682, which are incorporated herein by reference.

An encoder 10 for the transform coding codec (e.g., Siren codec) is illustrated in FIG. 1A. The encoder 10 receives a digital signal 12 that has been converted from an analog audio signal. The amplitude of the analog audio signal has been sampled at a certain frequency and has been converted to a number that represents the amplitude. The typical sampling frequency is approximately 8 kHz (i.e., sampling 8,000 times per second), 16 kHz to 196 kHz, or something in between. In one example, this digital signal 12 may have been sampled at 48 kHz or other rate in about 20-ms blocks or frames.

A transform 20, which can be a Discrete Cosine Transform (DCT), converts the digital signal 12 from the time domain into a frequency domain having transform coefficients. For example, the transform 20 can produce a spectrum of 960 transform coefficients for each audio block or frame. The encoder 10 finds average energy levels (norms) for the coefficients in a normalization process 22. Then, the encoder 10 quantizes the coefficients with a Fast Lattice Vector Quantization (FLVQ) algorithm 24 or the like to encode an output signal 14 for packetization and transmission.

A decoder 50 for the transform coding codec (e.g., Siren codec) is illustrated in FIG. 1B. The decoder 50 takes the incoming bit stream of the input signal 52 received from a network and recreates a best estimate of the original signal from it. To do this, the decoder 50 performs a lattice decoding (reverse FLVQ) 60 on the input signal 52 and de-quantizes the decoded transform coefficients using a de-quantization process 62. In addition, the energy levels of the transform coefficients may then be corrected in the various frequency bands. Finally, an inverse transform 64 operates as a reverse DCT and converts the signal from the frequency domain back into the time domain for transmission as an output signal 54.

Although such audio codecs are effective, increasing needs and complexity in audio conferencing applications call for more versatile and enhanced audio coding techniques. For example, audio codecs must operate over networks, and various conditions (bandwidth, different connection speeds of receivers, etc.) can vary dynamically. A wireless network is one example where a channel's bit rate varies over time. Thus, an endpoint in a wireless network has to send out a bit stream at different bit rates to accommodate the network conditions.

Use of an MCU (Multi-way Control Unit), such as Polycom's RMX series and MGC series products, is another example where more versatile and enhanced audio coding techniques may be useful. For example, an MCU in a conference first receives a bit stream from a first endpoint A and then needs to send bit streams at different lengths to a number of other endpoints B, C, D, E, F . . . . The different bit streams to be sent can depend on how much network bandwidth each of the endpoints has, upon the decoding capabilities of the endpoint, or upon other factors. For example, one endpoint B may be connected to the network at 64 k bps (bits per second) for audio, while another endpoint C may be connected at only 8 kbps.

Accordingly, the MCU sends the bit stream at 64 kbps to the one endpoint B, sends the bit stream at 8 kbps to the other endpoint C, and so on for each of the endpoints. Currently, the MCU decodes the bit stream from the first endpoint A, i.e., converts it back to time domain. Then, the MCU encodes a separate stream for every single endpoint B, C, D, E, F . . . so the appropriate bit streams can be sent to them. Obviously, this approach requires many computational resources, introduces signal latency, and degrades signal quality due to the transcoding performed.

Dealing with lost packets is another area where more versatile and enhanced audio coding techniques may be useful. In videoconferencing or VoIP calls, for example, coded audio information is sent in packets that typically have 20 milliseconds of audio per packet. Packets can be lost during transmission, and the lost audio packets lead to gaps in the received audio. One way to combat the packet loss in the network is to transmit the packet (i.e., bit stream) multiple times, say 4 times. The chance of losing all four of these packets is much lower so the chance of having gaps is lessened.

Transmitting the packet multiple times, however, requires the network bandwidth to increase by four times. To minimize the costs, usually the same 20 ms time-domain signal is encoded at a higher bit rate (in a normal mode, say 48 k bps) and encoded at a lower bit rate (say, 8 kbps). The lower (8 kbps) bit stream is the one transmitted multiple times. This way, the total required bandwidth is 48+8*3=72 kbps, instead of 48*4=192 kbps if the original were sent multiple times. Due to the masking effect, the 48+8*3 scheme performs nearly as well as the 48*4 scheme in terms of speech quality when the network has packet loss. Yet, this traditional solution of encoding the same 20 ms time domain data independently at different bit rates requires computational resources.

Lastly, some endpoints may not have enough computational resources to do a full decoding. For example, an endpoint may have a slower signal processor, or the signal processor may be busy doing other tasks. If this is the case, decoding only part of the bit stream that the endpoint receives may not produce useful audio. As is known, audio quality typically depends, at least in part, on how many bits the decoder receives and decodes.

For these reasons, a need exists for an audio codec that is scalable for use in audio and video conferencing.

SUMMARY

As noted in the Background, increasing needs and complexity in audio conferencing applications call for more versatile and enhanced audio coding techniques. Specifically, a need exists for an audio codec that is scalable for use in audio and video conferencing.

Use of a scalable audio codec to implement distributed mixing and/or sender bit rate regulation in a distributed audio network (e.g., a multipoint conference) is disclosed. The scalable audio codec allows the audio signal from each audio device (e.g., endpoint) to be split into one or more frequency bands and for the transform coefficients within such bands to be prioritized such that usable audio may be decoded from a subset of the entire signal. The subset may be created by omitting certain frequency bands and/or by omitting certain coefficients within the frequency bands. By providing various rules for each audio device or endpoint in a distributed audio network or conference), the audio device or endpoint can determine the importance of its signal to the audio network or conference and can select an appropriate bit rate, thereby conserving bandwidth and/or processing power throughout the audio network or conference.

According to the present disclosure, a scalable audio codec for a processing device determines first and second bit allocations for each frame of input audio. First bits are allocated for a first frequency band, and second bits are allocated for a second frequency band. The allocations are made on a frame-by-frame basis based on energy ratios between the two bands. For each frame, the codec transforms both frequency bands into two sets of transform coefficients, which are quantized based on the bit allocations and then packetized. The packets are then transmitted with the processing device. Additionally, the frequency regions of the transform coefficients can be arranged in order of importance determined by power levels and perceptual modeling. Should bit stripping occur, the decoder at a receiving device can produce audio of suitable quality given that bits have been allocated between the bands and that the regions of transform coefficients have been ordered by importance.

The scalable audio codec performs a dynamic bit allocation on a frame-by-frame basis for input audio. The total available bits for the frame are allocated between a low frequency band and a high frequency band. In one arrangement, the low frequency band includes 0 to 14 kHz, while the high-frequency band includes 14 kHz to 22 kHz. The ratio of energy levels between the two bands in the given frame determines how many of the available bits are allocated for each band. In general, the low frequency band will tend to be allocated more of the available bits. This dynamic bit allocation on a frame-by-frame basis allows the audio codec to encode and decode transmitted audio for consistent perception of speech tonality. In other words, the audio can be perceived as full-band speech even at extremely low bit rates that may occur during processing. This is because a bandwidth of at least 14 kHz is always obtained.

The scalable audio codec extends frequency bandwidth up to full band, i.e., to 22 kHz. Overall, the audio codec is scalable from about 10 kbps up to 64 kbps. The value of 10 kpbs may differ and is chosen for acceptable coding quality for a given implementation. In any event, the coding quality of the disclosed audio codec can be about the same as the fixed-rate, 22 kHz-version of the audio codec known as Siren 14. At 28 kbps and above, the disclosed audio codec is comparable to a 22 kHz codec. Otherwise, below 28 kpbs, the disclosed audio codec is comparable to a 14 kHz codec in that it has at least 14 kHz bandwidth at any rate. The disclosed audio codec can distinctively pass tests using sweep tones, white noises, are real speech signals. Yet, the disclosed audio codec requires computing resources and memory requirements that are only about 1.5× what is currently required of the existing Siren 14 audio codec.

In addition to the bit allocation, the scalable audio codec performs bit reordering based on the importance of each region in each of the frequency bands. For example, the low frequency band of a frame has transform coefficients arranged in a plurality of regions. The audio codec determines the importance of each of these regions and then packetizes the regions with allocated bits for the band in the order of importance. One way to determine the importance of the regions is based on the power levels of the regions, arranging those with highest power levels to the least in order of importance. This determination can be expanded based on a perceptual model that uses a weighting of surrounding regions to determine importance.

Decoding packets with the scalable audio codec takes advantage of the bit allocation and the reordered frequency regions according to importance. Should part of the bit stream of a received packet be stripped for whatever reason, the audio codec can decode at least the lower frequency band first in the bit stream, with the higher frequency band potentially bit stripped to some extent. Also, due to the ordering of the band's regions for importance, the more important bits with higher power levels are decoded first, and they are less likely to be stripped.

As discussed above, the scalable audio codec of the present disclosure allows bits to be stripped from a bit stream generated by the encoder, while the decoder can still produce intelligible audio in time domain. For this reason, the scalable audio codec can be useful in a number of applications, some of which are discussed below.

In one example, the scalable audio codec can be useful in a wireless network in which an endpoint has to send out a bit stream at different bit rates to accommodate network conditions. When an MCU is used, the scalable audio codec can create bit streams at different bit rates for sending to the various endpoints by stripping bits, rather than by the conventional practice. Thus, the MCU can use the scalable audio codec to obtain an 8 kbps bit stream for a second endpoint by stripping off bits from a 64 kbps bit stream from a first endpoint, while still maintaining useful audio.

Alternatively, the bit stripping of an encoded audio signal can take place at a transmitting endpoint based on some other factor, such as whether the transmitting endpoint is the active primary speaker. This may be determined in a variety of ways, including by determining the energy content of the current speech signal and comparing that either to historical values, the current energy of signal(s) from other endpoints, or to a predetermined threshold. This technique may be augmented by or replaced by a perceptual model that seeks to distinguish speech from background noise, etc.

In such a case, a transmitting endpoint can send the full bit stream (if otherwise able) so that all conference participants will be able to hear the higher definition audio of that endpoint. If the transmitting endpoint is not the currently active speaker, the endpoint can "self-strip" its own bits so that it sends only the lower frequency band. This conserves bandwidth and also reduces the computational requirements for either the MCU (which can simply relay everything it receives to the other endpoints) or the receiving endpoints (which do not need to expend additional resources decoding higher fidelity audio for something that is not the primary focus at that moment).

In another variation, the transmitting endpoint can simply send all bits of its highest bit stream, and the MCU can relay the full bit stream to all participants of the conference. Yet, each individual receiving endpoint can perform bit stripping to serve its own needs. For example, to reduce computational resources, a receiving endpoint might opt to decode the higher frequency bands only for the currently active speaker. (Which signal contains the currently active speaker can be determined in a variety of ways as noted below.) For the non-active speakers, the receiving endpoints can discard bits corresponding to the higher frequency bands, as this will not significantly degrade the audio quality of the conference while still providing adequate quality should a non-active endpoint make a short response or comment during the conference.

Use of the scalable audio codec can also help to save computational resources when dealing with lost packets. As noted previously, the traditional solution to deal with lost packets has been to encode the same 20 ms time domain data independently at high and low bit rates (e.g., 48 kbps and 8 kbps) so the low quality (8 kbps) bit stream can be sent multiple times. When the scalable audio codec is used, however, the codec only needs to encode once, because the second (low quality) bit stream is obtained by stripping off bits from the first (high quality) bit stream, while still maintaining useful audio.

Lastly, the scalable audio codec can help in cases where an endpoint may not have enough computational resources to do a full decoding. For example, the endpoint may have a slower signal processor, or the signal processor may be busy doing other tasks. In this situation, using the scalable audio codec to decode part of the bit stream that the endpoint receives can still produce useful audio.

The foregoing summary is not intended to summarize each potential embodiment or every aspect of the present disclosure.

DETAILED DESCRIPTION

An audio codec according to the present disclosure is scalable and allocates available bits between frequency bands. In addition, the audio codec orders the frequency regions of each of these bands based on importance. If bit stripping occurs, then those frequency regions with more importance will have been packetized first in a bit stream. In this way, more useful audio will be maintained even if bit stripping occurs. These and other details of the audio codec are disclosed herein.

Various embodiments of the present disclosure may find useful application in fields such as audio conferencing, video conferencing, and streaming media, including streaming music or speech. Accordingly, an audio processing device of the present disclosure can include an audio conferencing endpoint, a videoconferencing endpoint, an audio playback device, a personal music player, a computer, a server, a telecommunications device, a cellular telephone, a personal digital assistant, VoIP telephony equipment, call center equipment, voice recording equipment, voice messaging equipment, etc. For example, special purpose audio or videoconferencing endpoints may benefit from the disclosed techniques. Likewise, computers or other devices may be used in desktop conferencing or for transmission and receipt of digital audio, and these devices may also benefit from the disclosed techniques.

A. Conferencing Endpoint

Figure 1A:
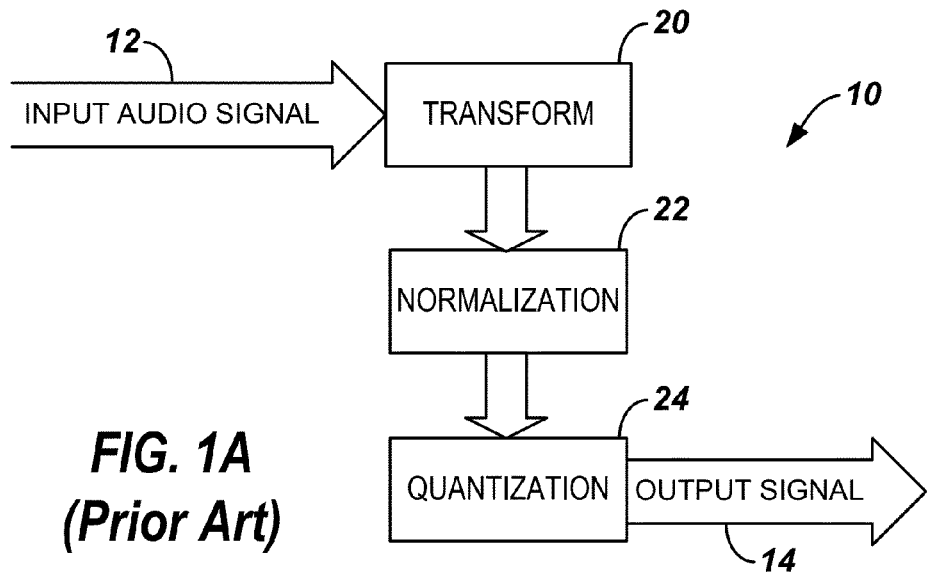
FIG. 1A shows an encoder of a transform coding codec.
Figure 1B:
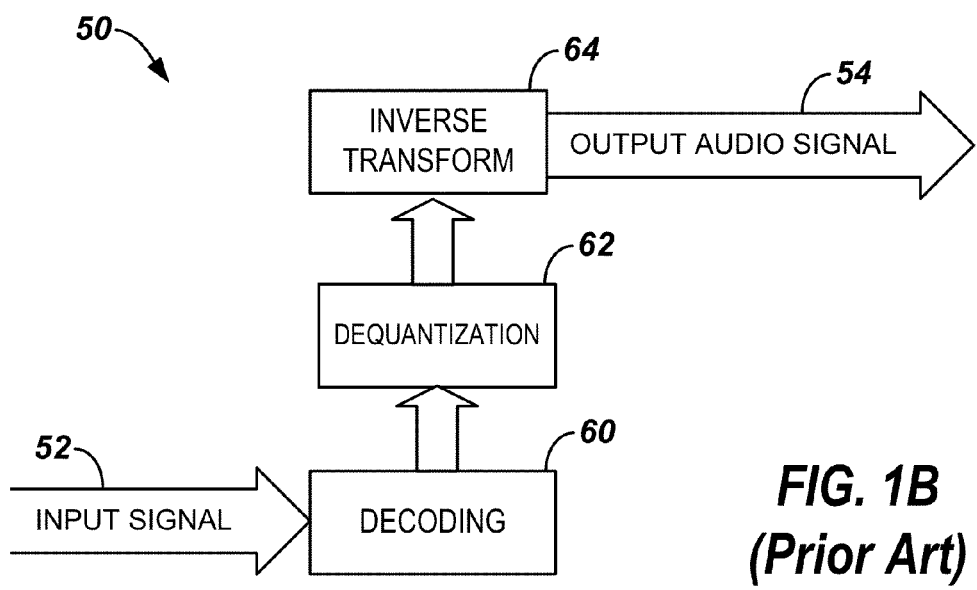
FIG. 1B shows a decoder of a transform coding codec.
Figure 2A:
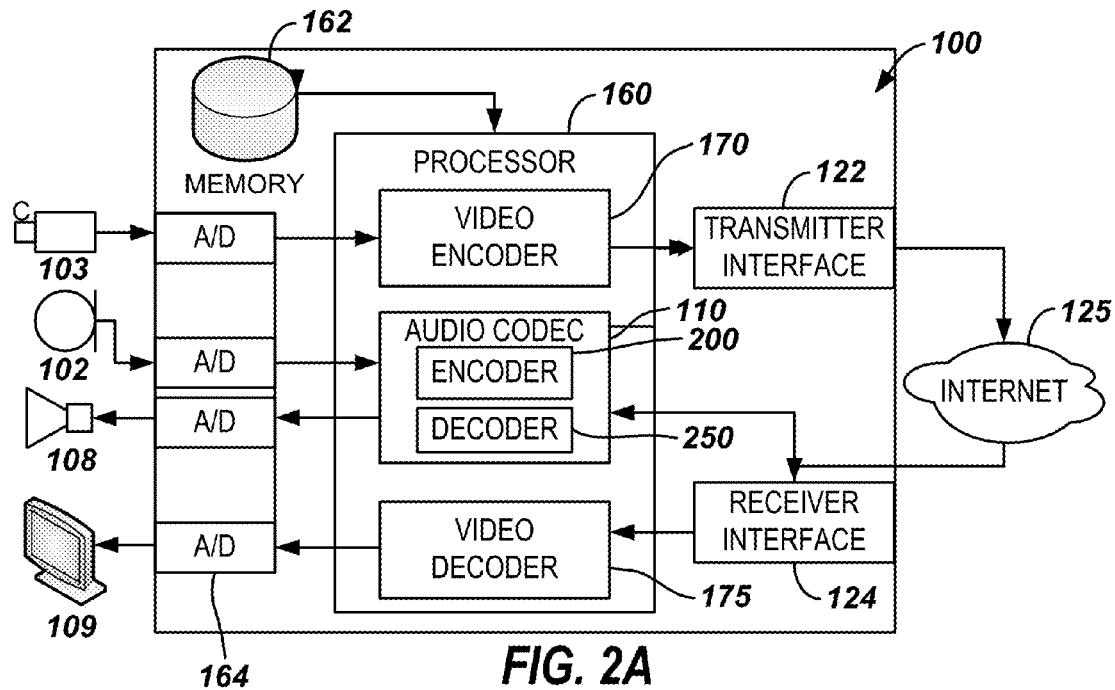
FIG. 2A illustrates an audio processing device, such as a conferencing terminal, for using encoding and decoding techniques according to the present disclosure.

As noted above, an audio processing device of the present disclosure can include a conferencing endpoint or terminal. FIG. 2A schematically shows an example of an endpoint or terminal 100. As shown, the conferencing terminal 100 can be both a transmitter and receiver over a network 125. As also shown, the conferencing terminal 100 can have videoconferencing capabilities as well as audio capabilities. In general, the terminal 100 has a microphone 102 and a loudspeaker 108 and can have various other input/output devices, such as video camera 103, display 109, keyboard, mouse, etc. Additionally, the terminal 100 has a processor 160, memory 162, converter electronics 164, and network interfaces 122/124 suitable to the particular network 125. The audio codec 110 provides standard-based conferencing according to a suitable protocol for the networked terminals. These standards may be implemented entirely in software stored in memory 162 and executing on the processor 160, on dedicated hardware, or using a combination thereof.

In a transmission path, analog input signals picked up by the microphone 102 are converted into digital signals by converter electronics 164, and the audio codec 110 operating on the terminal's processor 160 has an encoder 200 that encodes the digital audio signals for transmission via a transmitter interface 122 over the network 125, such as the Internet. If present, a video codec having a video encoder 170 can perform similar functions for video signals.

In a receive path, the terminal 100 has a network receiver interface 124 coupled to the audio codec 110. A decoder 250 decodes the received audio signal, and converter electronics 164 convert the digital signals to analog signals for output to the loudspeaker 108. If present, a video codec having a video decoder 172 can perform similar functions for video signals.

B. Audio Processing Arrangement

Figure 2B:
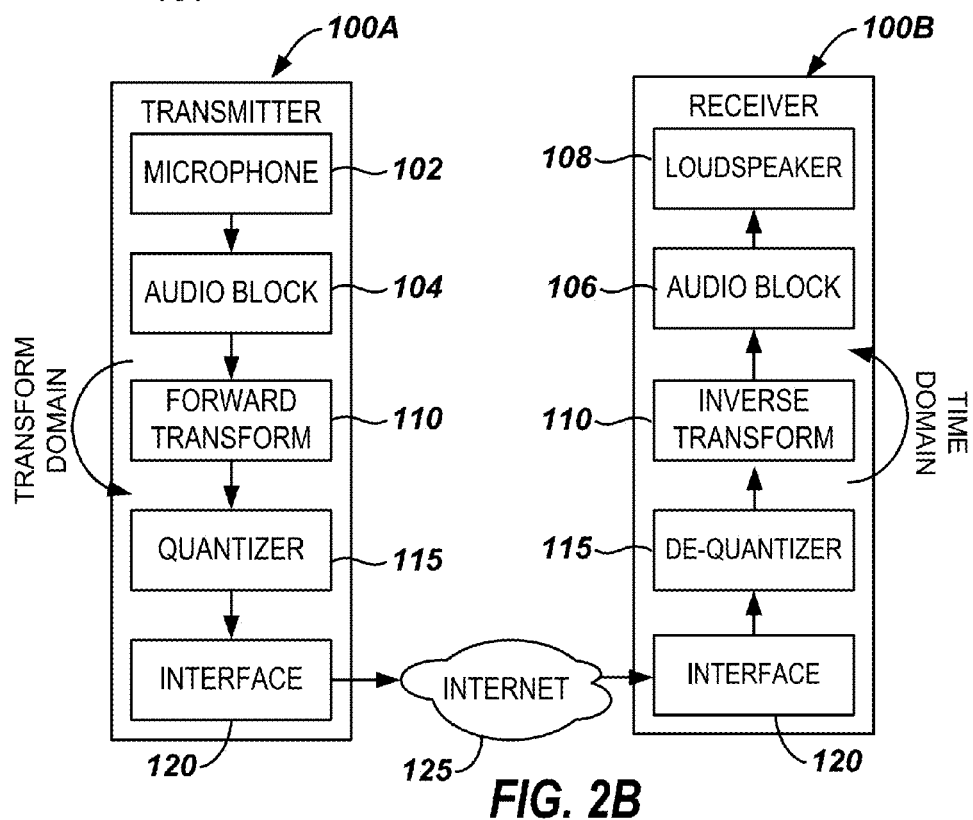
FIG. 2B illustrates a conferencing arrangement having a transmitter and a receiver for using encoding and decoding techniques according to the present disclosure.

FIG. 2B shows a conferencing arrangement in which a first audio processing device 100A (acting as a transmitter) sends compressed audio signals to a second audio processing device 100B (acting as a receiver in this context). Both the transmitter 100A and receiver 100B have a scalable audio codec 110 that performs transform coding similar to that used in ITU G. 722.1 (Polycom Siren 7) or ITU G.722.1.0 (Polycom Siren 14). For the present discussion, the transmitter and receiver 100A-B can be endpoints or terminals in an audio or video conference, although they may be other types of devices.

During operation, a microphone 102 at the transmitter 100A captures source audio, and electronics sample blocks or frames of that audio. Typically, the audio block or frame spans 20-milliseconds of input audio. At this point, a forward transform of the audio codec 110 converts each audio frame to a set of frequency domain transform coefficients. Using techniques known in the art, these transform coefficients are then quantized with a quantizer 115 and encoded.

Once encoded, the transmitter 100A uses its network interface 120 to send the encoded transform coefficients in packets to the receiver 100B via a network 125. Any suitable network can be used, including, but not limited to, an IP (Internet Protocol) network, PSTN (Public Switched Telephone Network), ISDN (Integrated Services Digital Network), or the like. For their part, the transmitted packets can use any suitable protocols or standards. For example, audio data in the packets may follow a table of contents, and all octets comprising an audio frame can be appended to the payload as a unit. Additional details of audio frames and packets are specified in ITU-T Recommendations G.722.1 and G.722.1C, which have been incorporated herein.

At the receiver 100B, a network interface 120 receives the packets. In a reverse process that follows, the receiver 100B de-quantizes and decodes the encoded transform coefficients using a de-quantizer 115 and an inverse transform of the codec 110. The inverse transform converts the coefficients back into the time domain to produce output audio for the receiver's loudspeaker 108. For audio and video conferences, the receiver 100B and transmitter 100A can have reciprocating roles during a conference.

C. Audio Codec Operation

Figure 3:
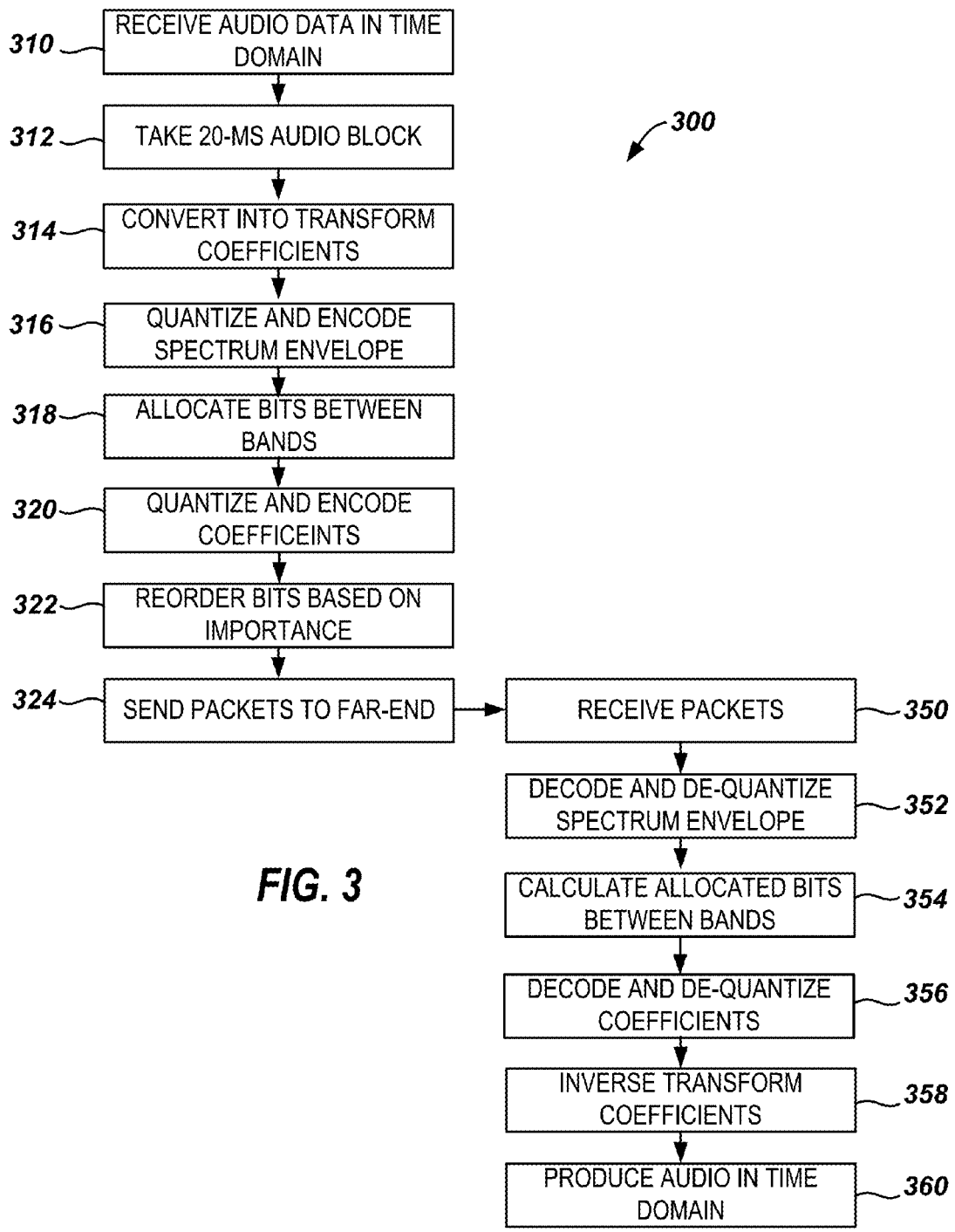
FIG. 3 is a flow chart of an audio coding technique according to the present disclosure.

With an understanding of the audio codec 110 and audio processing device 100 provided above, discussion now turns to how the audio codec 110 encodes and decodes audio according to the present disclosure. As shown in FIG. 3, the audio codec 110 at the transmitter 110A receives audio data in the time domain (Block 310) and takes an audio block or frame of the audio data (Block 312).

Using the forward transform, the audio codec 110 converts the audio frame into transform coefficients in the frequency domain (Block 314). As discussed above, the audio codec 110 can use Polycom Siren technology to perform this transform. However, the audio codec can be any transform codec, including, but not limited to, MP3, MPEG AAC, etc.

When transforming the audio frame, the audio codec 110 also quantizes and encodes the spectrum envelope for the frame (Block 316). This envelope describes the amplitude of the audio being encoded, although it does not provide any phase details. Encoding the envelope spectrum does not require a great deal of bits so it can be readily accomplished. Yet, as will be seen below, the spectrum envelope can be used later during audio decoding if bits are stripped from transmission.

When communicating over a network, such as the Internet, bandwidth can change, packets can be lost, and connection rates may be different. To account for these challenges, the audio codec 110 of the present disclosure is scalable. In this way, the audio codec 110 allocates available bits between at least two frequency bands in a process described in more detail later (Block 318). The codec's encoder 200 quantizes and encodes the transform coefficients in each of the allocated frequency bands (Block 320) and then reorders the bits for each frequency region based on the region's importance (Block 322). Overall, the entire encoding process may only introduce a delay of about 20 ms.

Determining a bits importance, which is described in more detail below, improves the audio quality that can be reproduced at the far-end if bits are stripped for any number of reasons. After reordering the bits, the bits are packetized for sending to the far-end. Finally, the packets are transmitted to the far-end so that the next frame can be processed (Block 324).

On the far-end, the receiver 100B receives the packets, handling them according to known techniques. The codec's decoder 250 then decodes and de-quantizes the spectrum envelope (Block 352) and determines the allocated bits between the frequency bands (Block 354). Details of how the decoder 250 determines the bit allocation between the frequency bands are provided later. Knowing the bit allocation, the decoder 250 then decodes and de-quantizes the transform coefficients (Block 356) and performs an inverse transform on the coefficients in each band (Block 358). Ultimately, the decoder 250 converts the audio back into the time domain to produce output audio for the receiver's loudspeaker (Blocks 360).

D. Encoding Technique

As noted above, the disclosed audio codec 110 is scalable and uses transform coding to encode audio in allocated bits for at least two frequency bands. Details of the encoding technique performed by the scalable audio codec 100 are shown in the flow chart of FIG. 4. Initially, the audio codec 110 obtains a frame of input audio (Block 402) and uses a Modulated Lapped Transform known in the art to convert the frame into transform coefficient (Block 404). As is known, each of these transform coefficients has a magnitude and may be positive or negative. The audio codec 110 also quantizes and encodes the spectrum envelope [0 Hz to 22 kHz] as noted previously (Block 406).

At this point, the audio codec 110 allocates bits for the frame between two frequency bands (Block 408). This bit allocation is determined dynamically on a frame-by-frame basis as the audio codec 110 encodes the audio data received. A dividing frequency between the two bands is chosen so that a first number of available bits are allocated for a low frequency region below the dividing frequency and the remaining bits are allocated for a higher frequency region above the dividing frequency.

After determining the bit allocation for the bands, the audio codec 110 encodes the normalized coefficients in both the low and high frequency bands with their respective allocated bits (Block 410). Then, the audio codec 110 determines the importance of each frequency region in both of these frequency bands (Block 412) and orders the frequency regions based on determined importance (Block 414).

As noted previously, the audio codec 110 can be similar to the Siren codec and can transform the audio signal from the time domain into the frequency domain having MLT coefficients. (For simplicity, the present disclosure refers to transform coefficients for such an MLT transform, although other types of transforms may be used, such as FFT (Fast Fourier Transform) and DCT (Discrete Cosine Transform), etc.)

At the sampling rate, the MLT transform produces approximately 960 MLT coefficients (i.e., one coefficient every 25 Hz). These coefficients are arranged in frequency regions according to ascending order with indices of 0, 1, 2, . . . . For example, a first region 0 covers the frequency range [0 to 500 Hz], the next region 1 covers [500 to 1000 Hz], and so on. Rather than simply sending the frequency regions in ascending order as is conventionally done, the scalable audio codec 110 can determine the importance of the regions in the context of the overall audio and then reorders the regions based on higher importance to less importance. This rearrangement based on importance is done in both of the frequency bands.

Determining the importance of each frequency region can be done in many ways. In one implementation, the encoder 200 determines the importance of the region based on the quantized signal power spectrum. In this case, the region having higher power has higher importance. In another implementation, a perceptual model can be used to determine the importance of the regions. The perceptual model masks extraneous audio, noise, and the like not perceived by people. Each of these techniques is discussed in more detail later.

After ordering based on importance, the most important region is packetized first, followed by the next most important region, and so on (Block 416). Finally, the ordered and packetized regions can be sent to the far-end over the network (Block 420). In sending the packets, indexing information on the ordering of the regions for the transform coefficients does not need to be sent. Instead, the indexing information can be calculated in the decoder based on the spectrum envelope that is decoded from the bit stream.

If bit stripping occurs, then those bits packetized toward the end may be stripped. Because the regions have been ordered, coefficients in the more important region have been packetized first. Therefore, regions of less importance being packetized last are more likely to be stripped if this occurs. Additionally or alternatively, the coefficients may also be sorted by frequency bands so that any one or more of the transmitting endpoint, MCU, or receiving endpoint can discard certain frequency bands in their entirety while stripping bits from other frequency bands with more selectivity.

At the far-end, the decoder 250 decodes and transforms the received data that already reflects the ordered importance initially given by the transmitter 100A. In this way, when the receiver 100B decodes the packets and produces audio in the time domain, the chances increase that the receiver's audio codec 110 will actually receive and process the more important regions of the coefficients in the input audio. As is expected, changes in bandwidth, computing capabilities, and other resources may change during the conference so that audio is lost, not coded, etc.

Having the audio allocated in bits between bands and ordered for importance, the audio codec 110 can increase the chances that more useful audio will be processed at the far-end. In view of all this, the audio codec 110 can still generate a useful audio signal even if bits are stripped off the bit stream (i.e., the partial bit stream) when there is reduced audio quality for whatever reason.

1. Bit Allocation

Figure 4A:
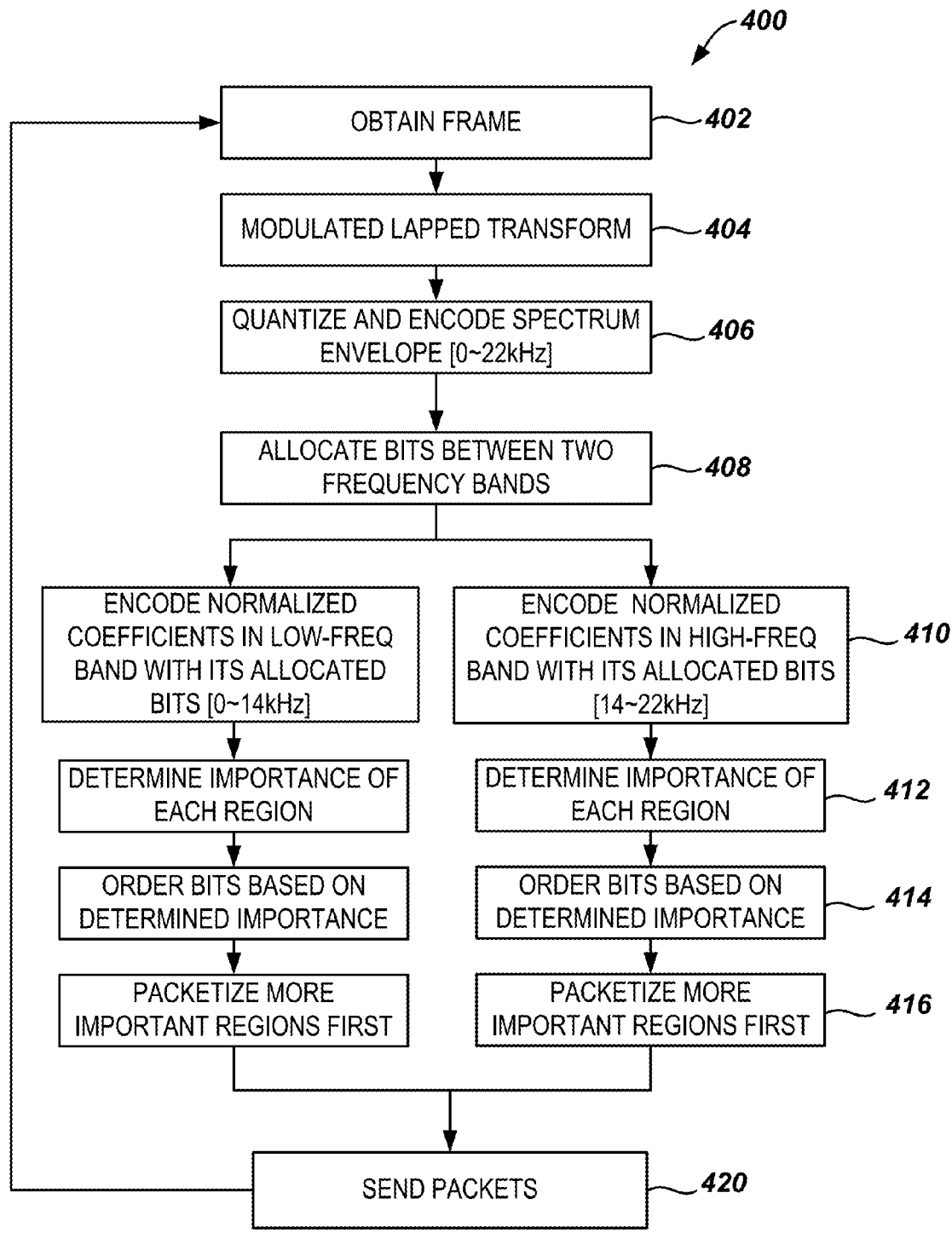
FIG. 4A is a flow chart showing the encoding technique in more detail.
Figure 4B:
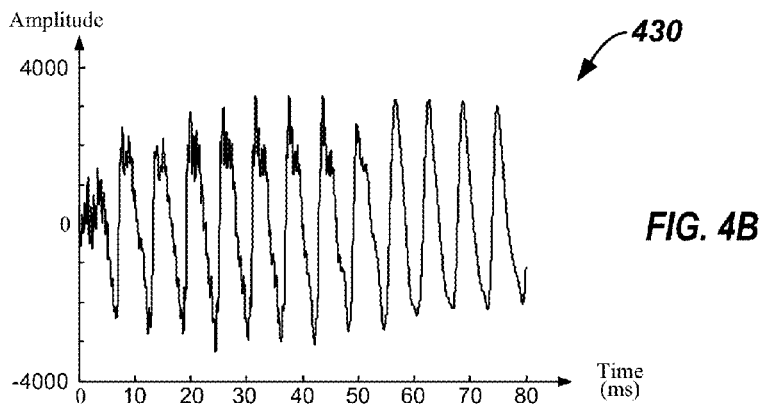
FIG. 4B shows an analog audio signal being sampled as a number of frames.
Figure 4C:
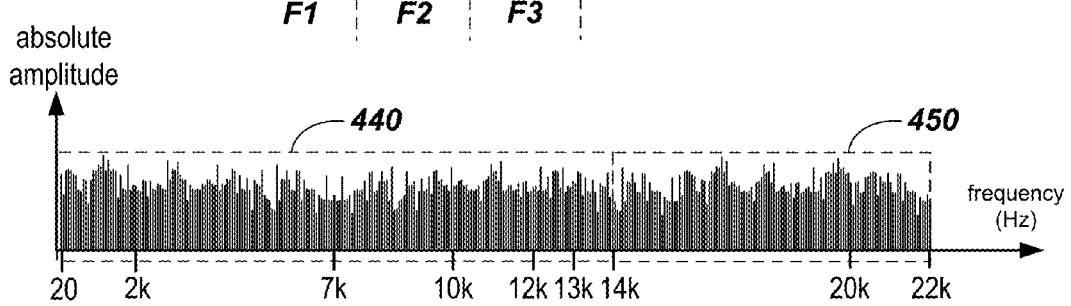
FIG. 4C shows a set of transform coefficients in the frequency domain that has been transformed from a sampled frame in the time domain.

As noted previously, the scalable audio code 110 of the present disclosure allocates the available bits between frequency bands. As shown in FIG. 4B, the audio codec (110) samples and digitizes an audio signal 430 at a particular sampling frequency (e.g., 48 kHz) in consecutive frames F1, F2, F3, etc. of approximately 20 ms each. (In actuality, the frames may overlap.) Thus, each frame F1, F2, F3, etc. has approximately 960 samples (48 kHz×0.02 s=960). The audio codec (110) then transforms each frame F1, F2, F3, etc. from the time domain to the frequency domain. For a given frame, for example, the transform yields a set of MLT coefficient as shown in FIG. 4C. There are approximately 960 MLT coefficients for the frame (i.e., one MLT coefficient for every 25 Hz). Due to the coding bandwidth of 22 kHz, the MLT transform coefficients representing frequencies above approximately 22 kHz may be ignored.

The set of transform coefficients in the frequency domain from 0 to 22 kHz must be encoded so the encoded information can be packetized and transmitted over a network. In one arrangement, the audio codec (110) is configured to encode the full-band audio signal at a maximum rate, which may be 64 kbps. Yet, as described herein, the audio codec (110) allocates the available bits for encoding the frame between two frequency bands.

To allocate the bits, the audio codec 110 can divide the total available bits between a first band [e.g., 0 to 12 kHz] and a second band [e.g., 12 kHz to 22 kHz]. The dividing frequency of 12 kHz between the two bands can be chosen primarily based on speech tonality changes and subjective testing. Other dividing frequencies could be used for a given implementation. Additionally, more bands could also be provided.

Splitting the total available bits is based on the energy ratio between the two bands. In one example, there can be four possible modes for splitting between the two bands. For example, the total available bits of 64 kbps can be divided as follows:

TABLE 1

Four Mode Bit Allocation Example

| Mode | Allocation for Signal <12 kHz | Allocation for Signal >12 kHz | Total Available Bandwidth (kbps) |
|------|-------------------------------|-------------------------------|----------------------------------|
| 0    | 48                            | 16                            | 64                               |
| 1    | 44                            | 20                            | 64                               |
| 2    | 40                            | 24                            | 64                               |
| 3    | 36                            | 28                            | 64                               |

Representing these four possibilities in the information transmitted to the far-end requires the encoder (200) to use 2 bits in the transmission's bit stream. The far-end decoder (250) can use the information from these transmitted bits to determine the bit allocation for the given frame when received. Knowing the bit allocation, the decoder (250) can then decode the signal based on this determined bit allocation.

In another arrangement shown in FIG. 4C, the audio codec (110) is configured to allocate the bits by dividing the total available bits between a first band (LoBand) 440 [0 to 14 kHz] and a second band (HiBand) 450 of [14 kHz to 22 kHz]. Although other values could be used depending on the implementation, the dividing frequency of 14 kHz may be preferred based on subjective listening quality in view of speech/music, noisy/clean, male voice/female voice, etc. Splitting the signal at 14 kHz into HiBand and LoBand also makes the scalable audio codec 110 comparable with the existing Siren14 audio codec.

In this arrangement, the frames can be split on a frame-by-frame basis with eight (8) possible splitting modes. The eight modes (bit_split_mode) are based on the energy ratio between the two bands 440/450. Here, the energy or power value for the low-frequency band (LoBand) is designated as LoBandsPower, while the energy or power value for the high-frequency band (HiBand) is designated as HiBandsPower. The particular mode (bit_split_mode) for a given frame is determined as follows:

```
if (HiBandsPower > (LoBandsPower*4.0))
    bit_split_mode = 7;
else if (HiBandsPower > (LoBandsPower*3.0))
    bit_split_mode = 6;
else if (HiBandsPower > (LoBandsPower*2.0))
    bit_split_mode = 5;
else if (HiBandsPower > (LoBandsPower*1.0))
    bit_split_mode = 4;
else if (HiBandsPower > (LoBandsPower*0.5))
    bit_split_mode = 3;
else if (HiBandsPower > (LoBandsPower*0.01))
    bit_split_mode = 2;
else if (HiBandsPower > (LoBandsPower*0.001))
    bit_split_mode = 1;
else bit_split_mode = 0;
```

Here, the power value for the low-frequency band (LoBandsPower) is computed as $$\sum_i \text{quantized\_region\_power}[i],$$

where the region index i=0, 1, 2 . . . 25.
(Because the bandwidth of each region is 500-Hz, the corresponding frequency range is 0 Hz to 12,500 Hz). A predefined table as available for the existing Siren codec can be used to quantize each region's power to obtain the value of quantized_region_powe[i]. For its part, the power value for the high-frequency band (HiBandsPower) is similarly computed, but uses the frequency range from 13 kHz to 22 kHz. Thus, the dividing frequency in this bit allocation technique is actually 13 kHz, although the signal spectrum is spilt at 14 kHz. This is done to pass a sweep sine-wave test.

The bit allocations for the two frequency bands 440/450 are then calculated based on the bit_split_mode determined from the energy ratio of the bands' power values as noted above. In particular, the HiBand frequency band gets (16+4*bit_split_mode) kbps of the total available 64 kbps, while the LoBand frequency band gets the remaining bits of the total 64 kbps. This breaks down to the following allocation for the eight modes:

TABLE 2

Eight Mode Bit Allocation Example

| Mode | Allocation for Signal <14 kHz | Allocation for Signal >14 kHz | Total Available Bandwidth (kbps) |
|------|-------------------------------|-------------------------------|----------------------------------|
| 0    | 48                            | 16                            | 64                               |
| 1    | 44                            | 20                            | 64                               |
| 2    | 40                            | 24                            | 64                               |
| 3    | 36                            | 28                            | 64                               |
| 4    | 32                            | 32                            | 64                               |
| 5    | 28                            | 36                            | 64                               |
| 6    | 24                            | 40                            | 64                               |
| 7    | 20                            | 44                            | 64                               |

Representing these eight possibilities in the information transmitted to the far-end requires the transmitting codec (110) to use 3 bits in the bit stream. The far-end decoder (250) can use the indicated bit allocation from these 3 bits and can decode the given frame based on this bit allocation.

Figure 4D:
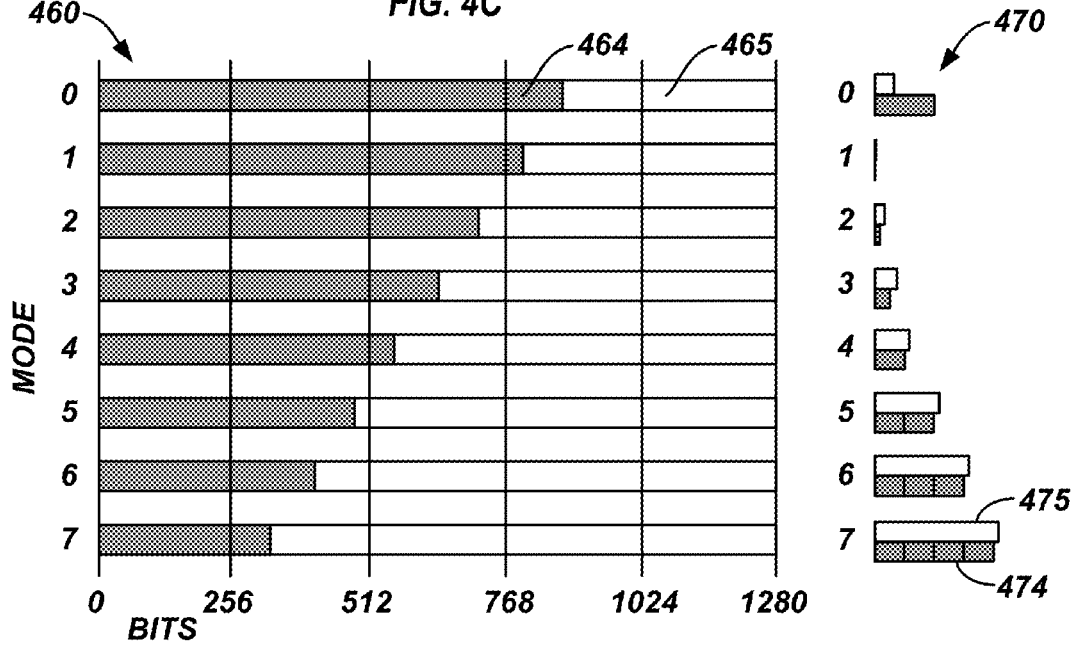
FIG. 4D show eight modes to allocate available bits for encoding the transform coefficients into two frequency bands.

FIG. 4D graphs bit allocations 460 for the eight possible modes (0-7). Because the frames have 20 millisecond of audio, the maximum bit rate of 64 kbps corresponds to a total of 1280 bits available per frame (i.e., 64,000 bps×0.02 s). Again, the mode used depends on the energy ratio of the two frequency bands' power values 474 and 475. The various ratios 470 are also graphically depicted in FIG. 4D.

Thus, if the HiBand's power value 475 is greater than four times the LoBand's power value 474, then the bit_split_mode determined will be "7." This corresponds to a first bit allocation 464 of 20 kbps (or 400 bits) for the LoBand and corresponds to a second bit allocation 465 of 44 kbps (or 880 bits) for the HiBand of the available 64 kbps (or 1280 bits). As another example, if the HiBand's power value 464 is greater than half of the LoBand's power value 465 but less than one times the LoBand's power value 464, then the bit_split_mode determined will be "3." This corresponds to the first bit allocation 464 of 36 kbps (or 720 bits) for the LoBand and to the second bit allocation 465 of 28 kbps (or 560 bits) for the HiBand of the available 64 kbps (or 1280 bits).

As can be seen from these two possible forms of bit allocation, determining how to allocate bits between the two frequency bands can depend on a number of details for a given implementation, and these bit allocation schemes are meant to be exemplary. It is even conceivable that more than two frequency bands may be involved in the bit allocation to further refine the bit allocation of a given audio signal. Accordingly, the entire bit allocation and audio encoding/decoding of the present disclosure can be expanded to cover more than two frequency bands and more or less split modes given the teachings of the present disclosure.

2. Reordering

As noted above, in addition to bit allocation, the disclosed audio codec (110) reorders the coefficients in the more important regions so that they are packetized first.

Figure 5A:
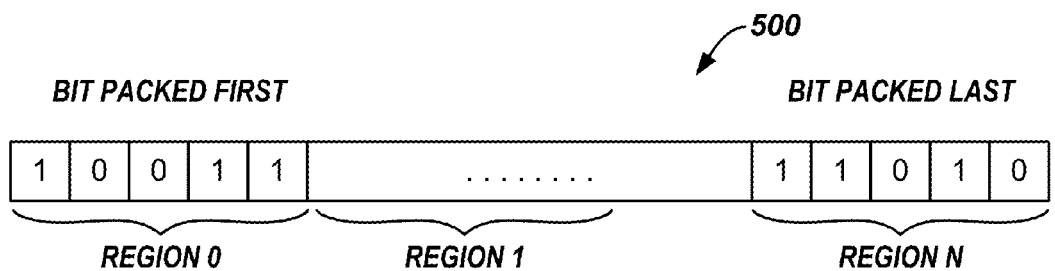
FIGS. 5A-5C shows examples of ordering regions in the encoded audio based on importance.

In this way, the more important regions are less likely to be removed when bits are stripped from the bit stream due to communication issues. For example, FIG. 5A shows a conventional packetization order of regions into a bit stream 500. As noted previously, each region has transform coefficients for a corresponding frequency range. As shown, the first region "0" for the frequency range [0 to 500 Hz] is packetized first in this conventional arrangement. The next region "1" covering [500 to 1000 Hz] is packetized next, and this process is repeated until the last region is packetized. The result is the conventional bit stream 500 with the regions arranged in ascending order of frequency region 0, 1, 2, ... N.

Figure 5B:

By determining importance of regions and then packetizing the more important regions first in the bit stream, the audio codec 110 of the present disclosure produces a bit stream 510 as shown in FIG. 5B. Here, the most important region (regardless of its frequency range) is packetized first, followed by the second most important region. This process is repeated until the least important region is packetized.

Figure 5C:
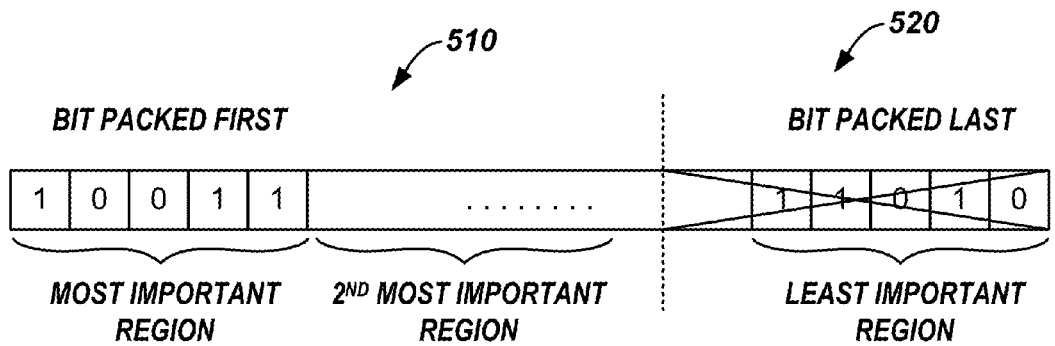

As shown in FIG. 5C, bits may be stripped from the bit stream 510 for any number of reasons. For example, bits may be dropped in the transmission or in the reception of the bit stream. Yet, the remaining bit stream can still be decoded up to those bits that have been retained. Because the bits have been ordered based on importance, the bits 520 for the least important regions are the ones more likely to be stripped if this occurs. In the end, the overall audio quality can be retained even if bit stripping occurs on the reordered bit stream 510 as evidence in FIG. 5C.

3. Power Spectrum Technique for Determining Importance

Figure 6A:
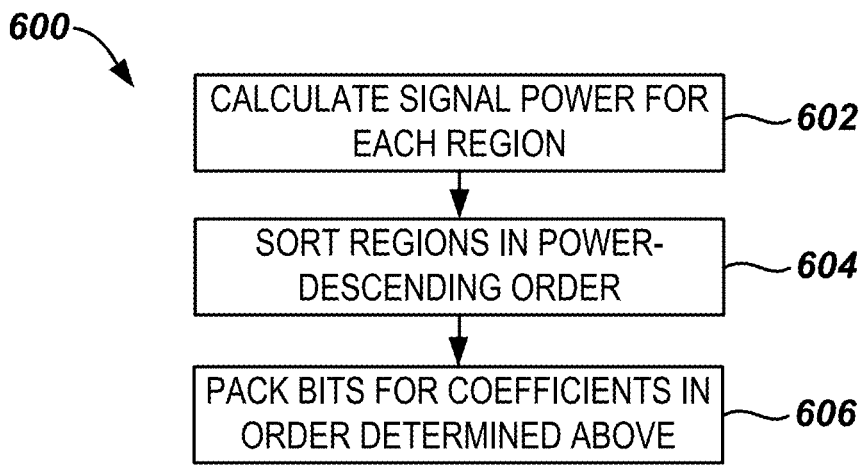
FIG. 6A is a flow chart showing a power spectrum technique for determining importance of regions in the encoded audio.

As noted previously, one technique for determining the importance of the regions in the coded audio uses the regions' power signals to order the regions. As shown in FIG. 6A, a power spectrum model 600 used by the disclosed audio codec (110) calculates the signal power for each region (i.e., region 0 [0 to 500 Hz], region 1 [500 to 1000 Hz], etc.) (Block 602). One way to do this is for the audio codec (110) to calculate the sum of the squares of each of the transform coefficients in the given region and use this for the signal power for the given region.

After converting the audio of the given frequency band into transform coefficients (as done at block 410 of FIG. 4 for example), the audio codec (110) calculates the square of the coefficients in each region. For the current transform, each region covers 500 Hz and has 20 transform coefficients that cover 25 Hz each. The sum of the square of each of these 20 transform coefficients in the given region produces the power spectrum for this region. This is done for each region in the subject band to calculate a power spectrum value for each of the regions in the subject band.

Once the signal powers for the regions have been calculated (Block 602), they are quantized (Block 603). Then the model 600 sorts the regions in power-descending order, starting with the highest power region and ending with the lowest power region in each band (Block 604). Finally, the audio codec (110) completes the model 600 by packetizing the bits for the coefficients in the order determined (Block 606).

In the end, the audio codec (110) has determined the importance of a region based on the region's signal power in comparison to other regions. In this case, the regions having higher power have higher importance. If the last packetized regions are stripped for whatever reason in the transmission process, those regions having the greater power signals have been packetized first and are more likely to contain useful audio that will not be stripped.

4. Perceptual Technique for Determining Importance

Figure 6B:
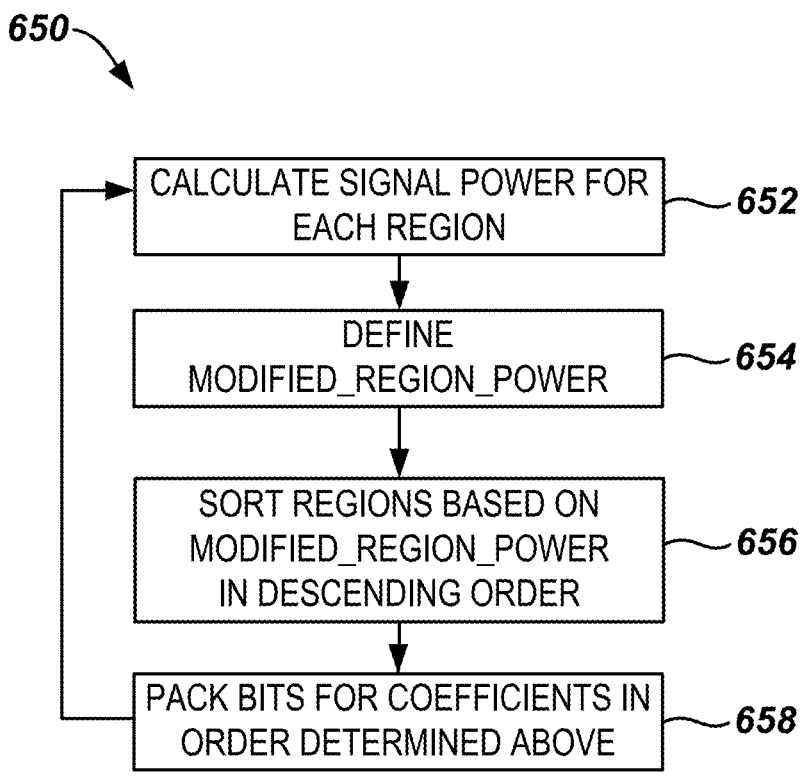
FIG. 6B is a flow chart showing a perceptual technique for determining importance of regions in the encoded audio.

As noted previously, another technique for determining the importance of a region in the coded signal uses a perceptual model 650—an example of which is shown in FIG. 6B. First, the perceptual model 650 calculates the signal power for each region in each of the two bands, which can be done in much the same way described above (Block 652), and then the model 650 quantizes the signal power (Block 653).

The model 650 then defines a modified region power value (i.e., modified_region_power) for each region (Block 654). The modified region power value is based on a weighted sum in which the effect of surrounding regions is taken into consideration when considering the importance of a given region. Thus, the perceptual model 650 takes advantage of the fact that the signal power in one region can mask quantization noise in another region and that this masking effect is greatest when the regions are spectrally near. Accordingly, the modified region power value for a given region (i.e., modified_region_power(region_index)) can be defined as:

SUM(weight[region_index,r]*quantized_region_power(r));

where r=[0 ... 43],
where quantized_region_power(r) is the region's calculated signal power; and
where weight[region_index, r] is a fixed function that declines as spectral distance|region_index−r|increases.

Thus, the perceptual model 650 reduces to that of FIG. 6A if the weighting function is defined as:

weight(region_index, r)=1 when r=region_index
weight(region_index, r)=0 when r !=region_index After calculating the modified region power value as outlined above, the perceptual model 650 sorts the regions based on the modified region power values in descending order (Block 656). As noted above, due to the weighting done, the signal power in one region can mask quantization noise in another region, especially when the regions are spectrally near one another. The audio codec (110) then completes the model 650 by packetizing the bits for the regions in the order determined (Block 658).

5. Packetization

As discussed above, the disclosed audio codec (110) encodes the bits and packetizes them so that details of the particular bit allocation used for the low and high frequency bands can be sent to the far-end decoder (250). Moreover, the spectrum envelope is packetized along with the allocated bits for the transform coefficients in the two frequency bands packetized. The following table shows how the bits are packetized (from the first bits to the last bits) in a bit stream for a given frame to be transmitted from the near end to the far end.

TABLE 3

PACKETIZATION EXAMPLE

| Split Mode | LoBand Frequency | | HiBand Frequency | |
|---|---|---|---|---|
| 3 bits for split_mode (8 modes total) | Bits for envelope in ascending region order | Allocated bits for normalized coefficients as reordered | Bits for envelope in ascending region order | Allocated bits for normalized coefficients as reordered |

As can be seen, the three (3) bits that indicate the particular bit allocation (of the eight possible modes) are packetized first for the frame. Next, the low-frequency band (LoBand) is packetized by first packetizing the bits for this band's spectrum envelope. Typically, the envelope does not need many bits to be encoded because it includes amplitude information and not phase. After packetizing bits for the envelope, the particular allocated number of bits is packetized for the normalized coefficients of the low frequency band (LoBand). The bits for the spectrum envelope are simply packetized based on their typical ascending order. Yet, the allocated bits for the low-frequency band (LoBand) coefficients are packetized as they have been reordered according to importance as outlined previously.

Finally, as can be seen, the high-frequency band (HiBand) is packetized by first packetizing the bits for the spectrum envelope of this band and then packetizing the particular allocated number of bits for the normalized coefficients of the HiBand frequency band in the same fashion.

E. Decoding Technique

Figure 7:
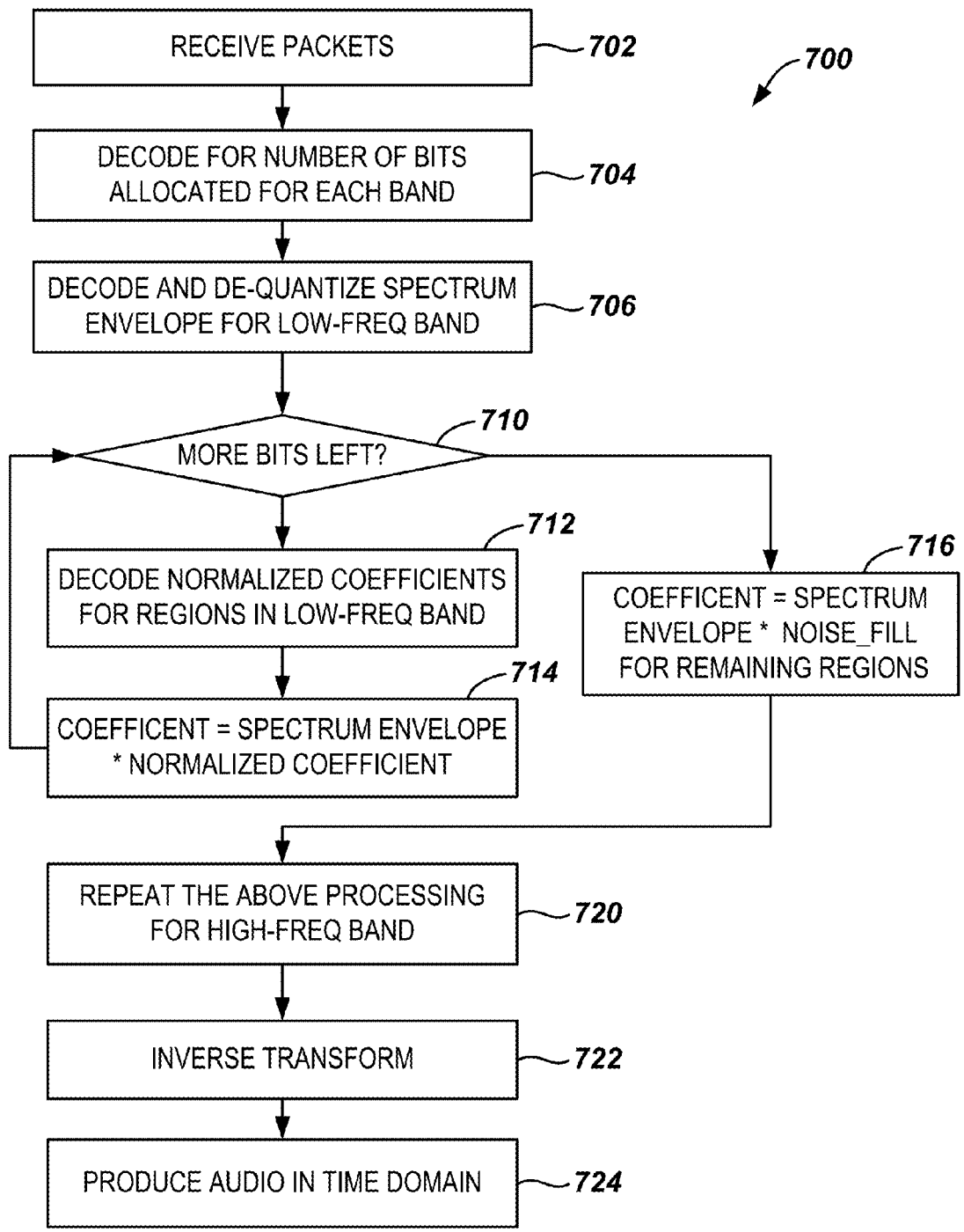
FIG. 7 is a flow chart showing the decoding technique in more detail.

As noted previously in FIG. 2A, the decoder 250 of the disclosed audio codec 110 decodes the bits when the packets are received so the audio codec 110 can transform the coefficients back to the time domain to produce output audio. This process is shown in more detail in FIG. 7.

Initially, the receiver (e.g., 100B of FIG. 2B) receives the packets in the bit stream and handles the packets using known techniques (Block 702). When sending the packets, for example, the transmitter 100A creates sequence numbers that are included in the packets sent. As is known, packets may pass through different routes over the network 125 from the transmitter 100A to the receiver 100B, and the packets may arrive at varying times at the receiver 100B. Therefore, the order in which the packets arrive may be random. To handle this varying time of arrival, called "jitter," the receiver 100B has a jitter buffer (not shown) coupled to the receiver's interface 120. Typically, the jitter buffer holds four or more packets at a time. Accordingly, the receiver 100B reorders the packets in the jitter buffer based on their sequence numbers.

Using the first three bits in the bit stream (e.g., 520 of FIG. 5B), the decoder 250 decodes the packets for the bit allocation of the given frame being handled (Block 704). As noted previously, depending on the configuration, there may be eight possible bit allocations in one implementation. Knowing the split used (as indicated by the first three bits), the decoder 250 can then decode for the number of bits allocated for each band.

Starting with the low frequency, the decoder 250 decodes and de-quantizes the spectrum envelope for low frequency band (LoBand) for the frame (Block 706). Then, the decoder 250 decodes and de-quantizes the coefficients for the low frequency band as long as bits have been received and not stripped. Accordingly, the decoder 250 goes through an iterative process and determines if more bits are left (Decision 710). As long as bits are available, the decoder 250 decodes the normalized coefficients for the regions in the low frequency band (Block 712) and calculates the current coefficient value (Block 714). For the calculation, the decoder 250 calculates the transform coefficients as: coeff=envelop*normalized_coeff, in which the spectrum envelope's value is multiplied by the normalized coefficient's value (Block 714). This continues until all the bits have been decoded and multiplied by the spectrum envelope value for the low frequency band.

Because the bits have been ordered according to the frequency regions' importance, the decoder 250 likely decodes the most important regions first in the bit stream, regardless of whether the bit stream has had bits stripped off or not. The decoder 250 then decodes the second most important region, and so on. The decoder 250 continues until all of the bits are used up (Decision 710).

When done with all the bits (which may not actually be all those originally encoded due to bit stripping), those least important regions which may have been stripped off are filled with noise to complete the remaining portion of the signal in this low-frequency band.

If the bit stream has been stripped of bits, the coefficient information for the stripped bits has been lost. However, the decoder 250 has already received and decoded the spectrum envelope for the low-frequency band. Therefore, the decoder 250 at least knows the signal's amplitude, but not its phase. To fill in noise, the decoder 250 fills in phase information for the known amplitude in the stripped bits.

To fill in noise, the decoder 250 calculates coefficients for any remaining regions lacking bits (Block 716). These coefficients for the remaining regions are calculated as the spectrum envelope's value multiplied times a noise fill value. This noise fill value can be a random value used to fill in the coefficients for missing regions lost due to bit stripping. By filling in with noise, the decoder 250 in the end can percieve the bit stream as full-band even at an extremely low bit rate, such as 10 kbps.

After handling the low frequency band, the decorder 250 repeats the entire process for the high frequency band (HiBand) (Block 720). Therefore, the decoder 250 decodes and dequantizes the HiBand's spectrum envelope, decodes the normalized coefficients for the bits, calculates current coefficientvalues for the bits, and calculates noise fill coefficients for remaining regions lacking bits (if stripped).

Now that the decoder 250 has determined the transform coefficients for all the regions in both the LoBand and HiBand and knows the ordering of the regions derived from the spectrum envelope, the decoder 250 performs an inverse transform on the transform coefficients to convert the frame to the time domain (Block 722). Finally, the audio codec can produce audio in the time domain (Block 724).

F. Audio Lost Packet Recovery

As disclosed herein, the scalable audio codec 110 is useful for handling audio when bit stripping has occurred. Additionally, the scalable audio codec 110 can also be used to help in lost packet recovery. To combat packet loss, a common approach is to fill in the gaps from lost packets by simply repeating previously received audio that has already been processed for output. Although this approach decreases the distortion caused by the missing gaps of audio, it does not eliminate the distortion. For packet loss rates exceeding 5 percent, for example, the artifacts cause by repeating previously sent audio become noticeable.

The scalable audio codec 110 of the present disclosure can combat packet loss by interlacing high quality and low quality versions of an audio frame in consecutive packets. Because it is scalable, the audio codec 110 can reduce computational costs because there is no need to code the audio frame twice at different qualities. Instead, the low-quality version is obtained simply by stripping bits off the high-quality version already produced by the scalable audio codec 110.

Figure 8:
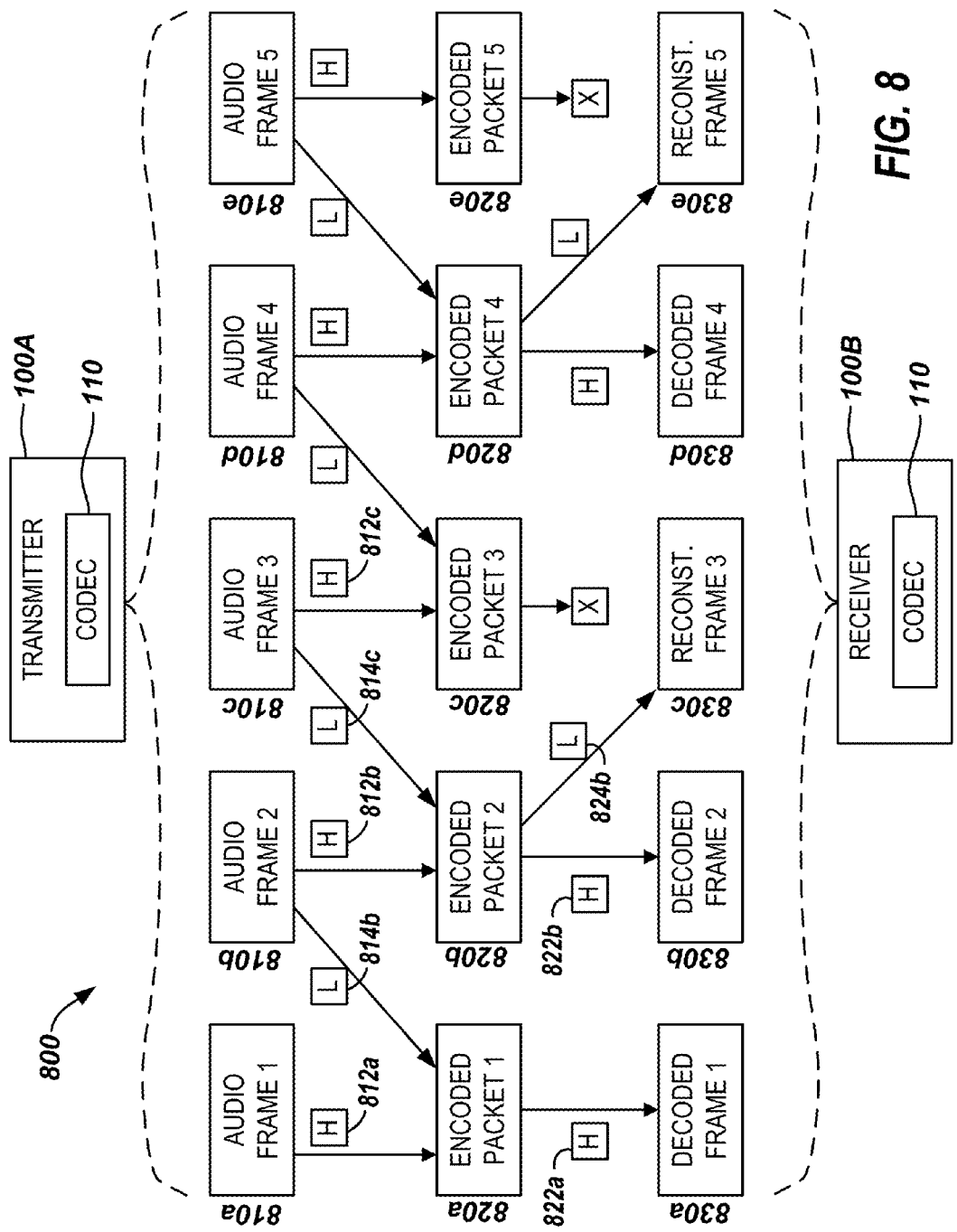
FIG. 8 shows a technique for dealing with audio packet loss using the disclosed scalable audio codec.

FIG. 8 shows how the disclosed audio codec 110 at a transmitter 100A can interlace high and low quality versions of audio frames without having to code the audio twice. In the discussion that follows, reference is made to a "frame," which can mean an audio block of 20-ms or so as described herein. Yet, the interlacing process can apply to transmission packets, transform coefficient regions, collection of bits, or the like. In addition, although the discussion refers to a minimum constant bit rate of 32 kbps and a lower quality rate of 8 kbps, the interlacing technique used by the audio codec 110 can apply to other bit rates.

Typically, the disclosed audio codec 110 can use a minimum constant bit rate of 32 kbps to achieve audio quality without degradation. Because the packets each have 20-ms of audio, this minimum bit rate corresponds to 640 bits per packet. However, the bit rate can be occasionally lowered to 8 kbps (or 160 bits per packet) with negligible subjective distortion. This can be possible because packets encoded with 640 bits appear to mask the coding distortion from those occasional packets encoded with only 160 bits.

In this process, the audio codec 110 at the transmitter 100A encodes a current 20-millisecond frame of audio using 640 bits for each 20-ms packet given a minimum bit rate of 32 kbps. To deal with potential loss of the packet, the audio codec 110 encodes a number N of future frames of audio using the lower quality 160 bits for each future frame. Rather than having to code the frames twice, however the audio codec 110 instead creates the lower quality future frames by stripping bits from the higher quality version. Because some transmit audio delay can be introduced, the number of possible low quality frames that can be coded may be limited, for example, to N=4 without the need to add additional audio delay to the transmitter 100A.

At this stage, the transmitter 100A then combines the high quality bits and low quality bits into a single packet and sends it to the receiver 100B. As shown in FIG. 8, for example, a first audio frame 810a is encoded at the minimum constant bit rate of 32 kbps. A second audio frame 810b is encoded at minimum constant bit rate of 32 kbps as well, but is also been encoded at the low quality of 160 bits. As noted herein, this lower quality version 814b is actually achieved by stripping bits from the already encoded higher quality version 812b. Given that the disclosed audio codec 110 sorts regions of importance, bit stripping the higher quality version 812b to the lower quality version 814b may actually retain some useful quality of the audio even in this lower quality version 814b.

To produce a first encoded packet 820a, the high quality version 812a of the first audio frame 810a is combined with the lower quality version 814b of the second audio frame 810b. This encoded packet 820a can incorporate the bit allocation and reordering techniques for low and high frequency bands split as disclosed above, and these techniques can be applied to one or both of the higher and low quality versions 812a/814b. Therefore, for example, the encoded packet 820a can include an indication of a bit split allocation, a first spectrum envelope for a low frequency band of the high quality version 812a of the frame, first transform coefficients in ordered region importance for the low frequency band, a second spectrum envelope for a high frequency band of the high quality version 812a of the frame, and second transform coefficients in ordered region importance for the high frequency band. This may then be followed simply by the low quality version 814b of the following frame without regard to bit allocation and the like. Alternatively, the following frame's low quality version 814b can include the spectrum envelopes and two band frequency coefficients.

The higher quality encoding, bit stripping to a lower quality, and combining with adjacent audio frames is repeated throughout the encoding process. Thus, for example, a second encoded packet 820b is produced that includes the higher quality version 810b of the second audio frame 810b combined with the lower quality version 814c (i.e., bit stripped version) of the third audio frame 810c.

At the receiving end, the receiver 100B receives the transmitted packets 820. If a packet is good (i.e., received), the receiver's audio codec 110 decodes the 640 bits representing the current 20-milliseconds of audio and renders it out the receiver's loudspeaker. For example, the first encoded packet 820a received at the receiver 110B may be good so the receiver 110B decodes the higher quality version 812a of the first frame 810a in the packet 820a to produce a first decoded audio frame 830a. The second encoded packet 820b received may also be good. Accordingly, the receiver 110B decodes the higher quality version 812b of the second frame 810b in this packet 820b to produce a second decoded audio frame 830b.

If a packet is bad or missing, the receiver's audio codec 110 use the lower quality version (160 bits of encoded data) of the current frame contained in the last good packet received to recover the missing audio. As shown, for example, the third encoded packet 820c has been lost during transmission. Rather than fill in the gap with another frame's audio as conventionally done, the audio codec 110 at the receiver 100B uses the lower quality audio version 814c for the missing frame 810c obtained from the previous encoded packet 820b that was good. This lower quality audio can then be used to reconstruct the missing third encoded audio frame 830c. In this way, the actual missing audio can be used for the frame of the missing packet 820c, albeit at a lower quality. Yet, this lower quality is not expected to cause much perceptible distortion due to masking.

G. The Multipoint Environment

In addition to the features described above, a scalable codec such as that described herein can be used in a multipoint environment to facilitate distributed audio mixing and bit rate regulation. For example, consider the exemplary conferencing environment illustrated in FIG. 9. The conference comprises a plurality of endpoints 900 (A, B, C, etc.), which may be as described above. Each endpoint 900 is connected to a conferencing network 930, illustrated as the Internet, but which may comprise any one or combination of known networking arrangements including a LAN or WAN, the PSTN, an ISDN, ATM, ADSL, or other form of network, etc. Also present on the network 930 is a multipoint control unit 950, which connects the endpoints 900 in a multi-way call.

Each endpoint 900 has a scalable audio codec 910 (similar to that described previously) and has a speech activity detector 920 (described below). The MCU 900 as a device on the network 930 can also have a scalable audio codec 910 and a speech activity detector 920. As is known, the endpoints 900 send and receive encoded audio signals via the network 930, and the MCU 950 handles the encoded audio signals for the multiple endpoints 900 in the multi-way call.

As noted previously, the MCU's scalable audio codec 910 can create bit streams at different bit rates for sending to the various endpoints 900 by stripping bits, rather than by the conventional practice. Thus, the MCU 950 can use its scalable audio codec 910 to obtain a lower resolution bit stream for one endpoint 900B by stripping off bits from a higher resolution bit stream from another endpoint 900A, while still maintaining useful audio. Alternatively, this bit stripping can take place at a transmitting endpoint (e.g., 900A) based on some other factor, such as whether the transmitting endpoint 900A has an active, primary speaker. This may be determined in a variety of ways, including by determining the energy content of the current speech signal and comparing that either to historical values, the current energy of signal(s) from other endpoints 900B-C, or to a predetermined threshold. This technique may be augmented by or replaced by a perceptual model that seeks to distinguish speech from background noise, etc.

In such a case, the transmitting endpoint (e.g., 900A) can send the full bit stream (if otherwise able) so that all conference participants at the other endpoints 900B-C will be able to hear the higher definition audio of that transmitting endpoint 900A. If the transmitting endpoint 900A is not the currently active speaker, the endpoint 900A can process the audio signals based on selected parameters of the endpoint's scalable audio codec 910. For example, the codec's parameters may be set to alter the bit allocation of the different frequency bands used in encoding the audio signals to emphasize some bands (i.e., lower frequencies) over other bands, to alter the ordering of frequency regions used in encoding based on importance to emphasize some bands over other bands, and/or to "self-strip" bits from the bit stream of its own encoded audio signal so that endpoint 900A sends only the lower frequency band. This processing conserves bandwidth and also reduces the computational requirements for either the MCU 950 (which can simply relay everything it receives to the other endpoints 900B-C) or the receiving endpoints 900B and 900C (which do not need to expend additional resources decoding higher fidelity audio for something that is not the primary focus at that moment).

In another variation, the transmitting endpoint 900A can simply send all bits of its highest quality bit stream, and the MCU 950 can relay the full bit stream to all the other endpoints 900B-C of the conference. Yet, each individual endpoint 900B-C can perform bit stripping to serve its own needs.

For example, the transmitting endpoint 900A may have a currently active speaker. Therefore, the transmitting endpoint 900A may send its full bit stream, and the MCU 950 can relay the full bit stream to all the other endpoints 900B-C of the conference. To reduce computational resources, a receiving endpoint (e.g., 900B) might opt to decode the higher frequency bands only for the received signal from an endpoint having a currently active speaker (i.e., 900A). (Which signal contains the currently active speaker can be determined in a variety of ways as noted below.) For signals from endpoints having non-active speakers (i.e., 900C), the receiving endpoints 900B can discard the bits corresponding to the higher frequency bands, as this will not significantly degrade the audio quality of the conference while still providing adequate quality should the non-active endpoint 900C interject into the conference.

Because of the nature of the scalable audio codec 910 described above, rather than mixing the audio signals from the various endpoints 900A-C for re-transmission to each participant endpoint 900A-C, as is done today, the transmitting endpoints 900A can send only certain components or all of the audio signal to the MCU 950, the MCU 950 can forward only certain components or all of the audio signals to each receiving endpoint 900, and/or each receiving endpoints 900B-C can decode only certain components or all of the audio signals. This versatility allows each endpoint 900A-C to create its own conference mix. Exactly how this is done can vary.

For example, each endpoint 900A, 900B, etc. can send its entire audio signal, which the MCU 950 can then forward in its entirety to all other endpoints 900, either with or without instructions as to how it should be included in the conference mix. Alternatively, each endpoint 900A-C can determine for itself whether it is in a particular state. Then, each endpoint 900A-C can process and send its own audio signals for the conference based on its and other endpoints' states and/or can receive and process audio signals received for the conference based on its and other endpoints' states. For example, each endpoint 900A-C can determine for itself whether it has a currently active speaker (using techniques like those described above for bit-allocating during encoding), whether there is a need to provide some level of background noise to enhance the realism of the conference, or whether the endpoint 900 can remain entirely silent without affecting the quality of the conference. Depending upon which of these states an endpoint 900 determines itself to be in, the endpoint 900 can then either send its audio signal at the highest resolution (i.e., including all frequency bands without any bit-stripping), by sending its audio signal at a lower resolution (i.e., by including only some frequency bands and/or by bit-stripping within those frequency bands), or by not sending any audio at all. As similar rationale can apply when the endpoint is receiving audio for the conference via the network 930.

To understand how such an embodiment would function, all of the devices (i.e., 900, 950) in the conference can use one shared speech activity detector 920 (residing, for example, in the MCU 950) to determine and send states, speech levels, codes, or the like in the audio RTP packets transmitted between the devices 900, 950. Alternatively, each receiving device (i.e., 900, 950) can choose to use its own speech activity detector 920, which it applies to each incoming audio stream, so each device (i.e., 900, 950) can monitor the speech level of each received stream. Moreover, each endpoint 900 can also monitor its own speech level using its own speech activity detector 920.

Such a speech activity detector 920 can take a variety of forms and can look at the total energy of the audio signal, can look at the energy level in a particular band or bands of the audio signal, and/or can use various perceptual models to detect speech. By then comparing speech levels and the various states of the endpoints 900, the sending and receiving of audio signals at a highest resolution (i.e., including all frequency bands without any bit-stripping), at a lower resolution (i.e., by including only some frequency bands and/or by bit-stripping within those frequency bands), or not at all (i.e., by not sending any audio at all) can be worked out in ways that conserve computational resources and available bandwidth.

Figure 9:
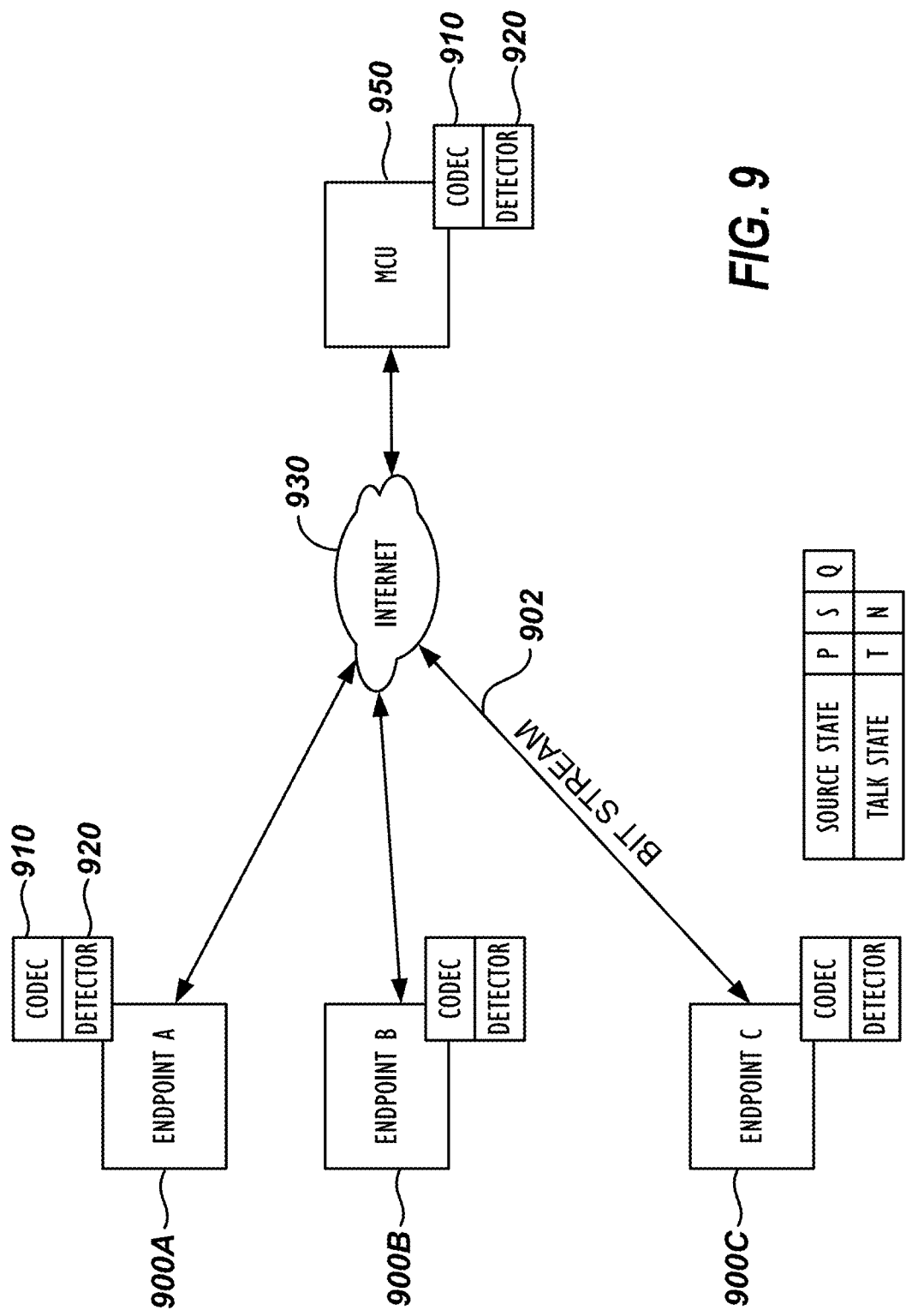
FIG. 9 shows a multipoint environment in which the disclosed scalable audio techniques of the present disclosure facilitate distributed audio mixing and bit rate regulation.

Overall, the conference mix in the multipoint environment of FIG. 9 can be modeled as having one or more endpoints 900 as primary sources (at full bit rate) and one or more endpoints 900 as secondary sources (at a lower bit rate), although additional levels of hierarchy may be provided. Based on this model, a given endpoint 900 can be designated a primary source (in which case its audio would preferably be handled at full bit rate) or a secondary source (in which case its audio would preferably be handled at a lower bit rate).

According to the model, each endpoint 900A-C can thus have one of two source states—i.e., Primary (P) or Secondary (S). A "Primary" endpoint 900 has its audio signal sent at an enhanced bit rate, and a "Secondary" endpoint 900 has its audio signal sent at a lower bit rate. As a further distinction, each endpoint 900A-C can have one of two talk states—i.e., Talking (T) and Not Talking (N), within its source state (P or S).

In other words, an endpoint 900 having a "Primary" (P) source state can have a talk state of either "Talking" (T) or "Not Talking" (N) depending on the audio signals analyzed by the speech activity detector 920 for that endpoint 900, MCU 950, or other endpoint. Likewise, an endpoint 900 having a "Secondary" (S) source state can also have a talk state of either "Talking" (T) or "Not Talking" (N). As detailed below, a third source state Quiet (Q) can also be used when an endpoint 900 is not sending audio signals.

As an additional feature of the model, the source designation of an endpoint 900 may have time limitations, which can be used in decisions of whether the endpoint's source designation should be changed or not. When an endpoint 900 is designated to be a Primary source, for example, the endpoint 900 commits to that decision for a time T1 (called the Primary Dwell Time). When an endpoint 900 is designated to be a Secondary source, for example, the endpoint 900 commits for a time T2 (called the Secondary Dwell Time). These times T1 and T2 can be set to common values by a conference control protocol, or they can be adapted independently for each endpoint 900 (for example, to take into account the path delay to the other endpoints 900). When the times T1 and T2 expire, the source state for the endpoint 900 may be subject to change depending on the circumstances as discussed later.

Given these various source states, talk states, and dwell times, the conference mixing for the particular endpoints 900 can be dynamically handled to conserve network bandwidth and computational resources of the endpoints 900 and/or MCU 950 depending on the dynamics of the conference audio during the multi-way call. To handle the changing audio environment, the endpoints 900 and/or MCU 950 use various rules to compare states of one or more endpoints 900 in the environment to determine how to process (i.e., encode, decode, bit strip, etc.) audio signals to conserve available bandwidth and computational resources. Various rules are discussed below with reference to FIGS. 10A through 12B.

Figures 10A, 10B:
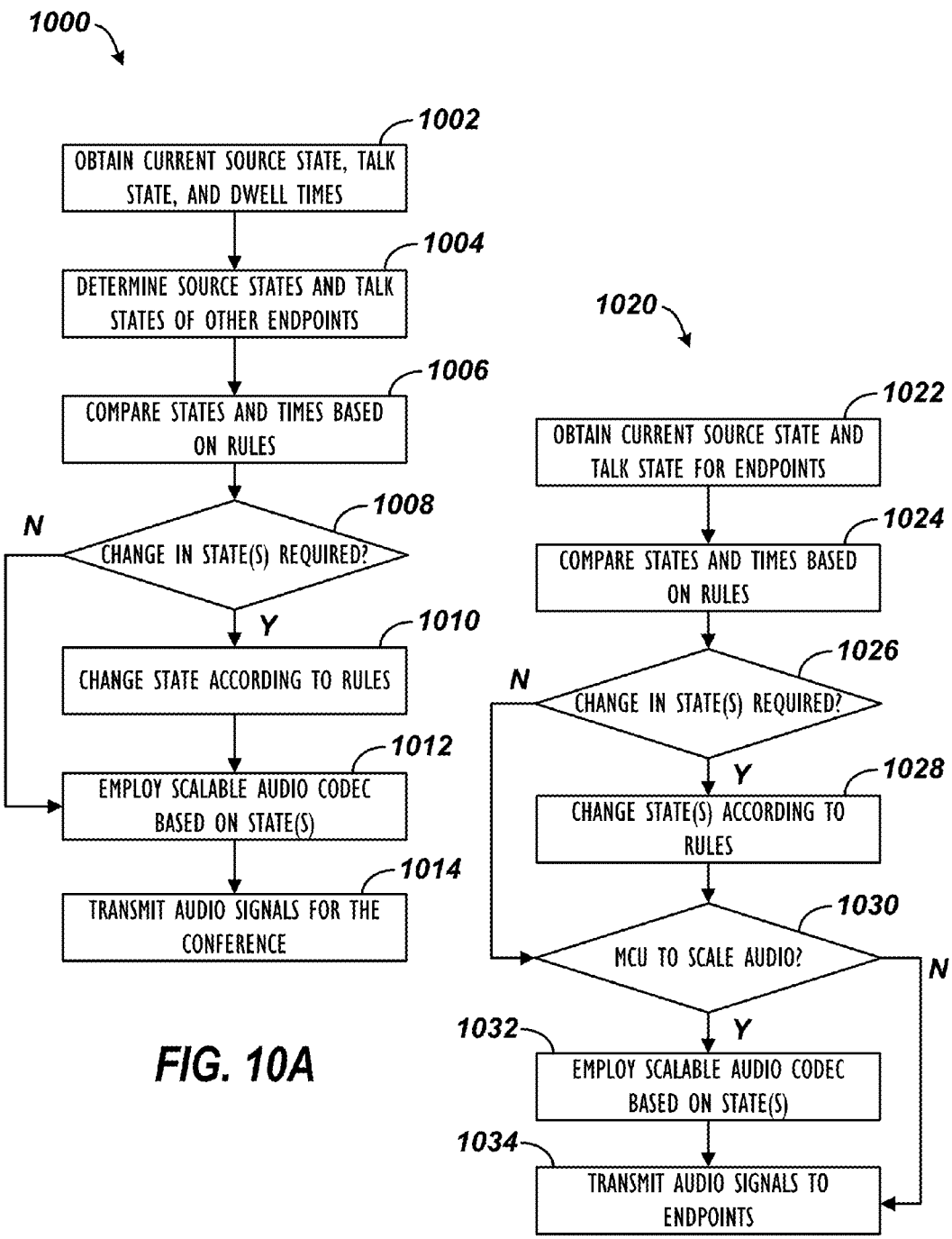
FIG. 10A shows a process in which an endpoint uses scalable audio in a multipoint environment
FIG. 10B shows a process in which an MCU uses scalable audio in a multipoint environment.

Before looking at the rules, discussion first turns to a process 1000 of FIG. 10A showing how an endpoint (e.g., 900A) uses scalable audio in a multipoint environment. During the conference when the endpoint 900A is either transmitting or receiving bit streams of audio, the endpoint 900A obtains its current source state, talk state, and dwell times (Block 1002). Some of these values for the endpoint 900A may be stored in memory and periodically updated or may be dynamically determined in real-time with a speech activity detector 220. The endpoint 900A also determines the source states and talk states of other endpoints (e.g., 900B & 900C) in the multi-way call (Block 1004). These values may also be stored in memory and periodically updated. Moreover, the states of the other endpoints 900B-C can be communicated in the bit streams received via the network 230, or they may be determined by the endpoint 900A's detector 220.

Either way, the endpoint 900A then compares the various states (including its states and those of other endpoints 900B-C) and its dwell times based on a number of rules (discussed below) (Block 1006). From the comparisons, the endpoint 900A determines whether one or more of its (source and talk) states needs to be changed depending on the current arrangement in the multi-way call (Decision 1008). If a change is required, then the endpoint 900A changes the one or more states according to the rules applied (Block 1010).

Regardless of whether a state has changed or not, the endpoint 900A can then employ its scalable audio codec 910 to process (encode, decode, bit strip, etc.) audio signals. The codec's parameters are determined by the endpoint's source and talk states (Block 1012). For example, when transmitting audio signals, the endpoint 900A can encode at a full bit rate if it is a primary or secondary source, can encode at a full bit rate and then bit strip if it is a secondary source, etc. When receiving audio signals, for example, the endpoint 900A can decode at full bit rate if the sending endpoint is a primary source, can decode the audio signal already bit stripped by the sending endpoint or the MCU, can bit strip and decode if the sending endpoint is a secondary source, etc. Ultimately, the endpoint 900A transmits the encoded audio signals via the network (for sending to other endpoints in the conference) or outputs the decoded audio signals for output at the endpoint (when receiving from other endpoints in the conference) (Block 1014).

As shown in FIG. 10B, the process 1020 for the MCU 950 to use scalable audio in a multipoint environment is not much different from an endpoint 900, except that the MCU 950 may not need to determine its own states or the like. During the conference, the MCU 950 obtains the current source states and talk states of the various endpoints (e.g., 900A-C) in the multi-way call (Block 1022). As noted above, the states of the endpoints 900A-C can be determined by the MCU's speech activity detector 200 or communicated in the bit streams received via the network 930.

The MCU 950 then compares the various states based on a number of rules (discussed below) (Block 1024). From the comparisons, the MCU 950 determines whether one or more of the endpoint's (source and talk) states needs to be changed depending on the current arrangement in the multi-way call (Decision 1026). If a change is required, then the MCU 950 changes the one or more states according to the rules applied (Block 1028). The MCU 950 can then determine whether it is responsible for scaling audio for the conference (Decision 1030), which can be predetermined or can be decided based on the circumstances.

If responsible for scaling, the MCU 950 employs its scalable audio codec 910 to scale the audio signals with the codec's parameters determined by the endpoint's source and talk states (Block 1032). For example, the MCU's codec 910 can decode the higher resolution signal and re-encode it at a lower resolution before sending on to an endpoint 900, although this may not be preferred. Instead, the MCU's codec 910 preferably strips bits from the already encoded bit stream from an endpoint 900 when the MCU 950 is responsible for scaling that endpoint's audio signal. The MCU 950 then transmits the scaled audio signals to the endpoints 900A-C for the conference (Block 1034). Rather than employing the codec 910, however, the MCU 950 in circumstances where it is not intended to scale the audio may simply transmit the current audio signals (i.e., relay the existing bit stream) to the endpoints 900A-C and may or may not instruct the endpoints 900A-C to scale the audio signal itself (Block 1034).

With an understanding how scalable audio can be used in a multipoint environment, discussion now turns to some of the various rules that can be applied during a conference when the endpoints 900A-C have various source and talk states.

FIGS. 11A-11D show rules for when an endpoint compares its source state to the source states of other endpoints in the multipoint environment. The rules can be applied by an endpoint 900 or the MCU 950 in the conference.

Figure 11A:
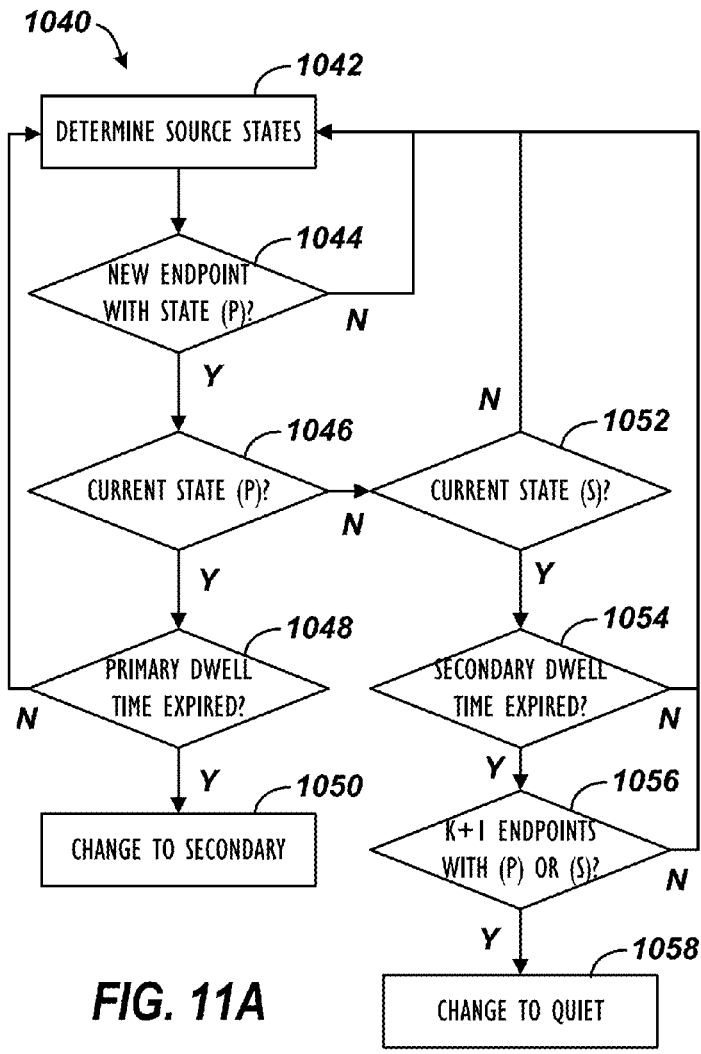
FIGS. 11A-11B show rules for when a given endpoint determines whether its source state should change.

In one rule set 1040 of FIG. 11A, the source state of a given endpoint (e.g., 900A) and those of other endpoints (e.g., 900B-C) in the multipoint conference are determined (Block 1042). The given endpoint's own source state may be stored. The other's source states may also be stored, and those stored states may be compared to current states communicated as part of the bit stream during the conference.

One of these other endpoints 900B-C may have a changed state so whether one of the other endpoints has a new Primary source state (P) is determined (Block 1044). If another endpoint (e.g., 900B) has such a new Primary state P, whether the given endpoint 900A also is in a Primary state P is also determined (Decision 1046) and if the given endpoint's Primary Dwell Time T1 has expired (Decision 1048). When both are true, then the given endpoint 900A is changed to a Secondary source state (S) (Block 1050). In other words, a primary source of conference audio reverts to a secondary source of audio after a predetermined time. This rule may be augmented by continuing to reset the Primary Dwell Time T1 for so long as the given endpoint 900A still has an active speech signal. See FIG. 11C.

When determining the given endpoint's current state, it may instead be determined that its current state is secondary (S) (Decision 1052). If the given endpoint's Secondary Dwell Time T2 has expired (Decision 1054) and there are more than a number of other endpoints (900B, C, etc.) in primary (P) or secondary (S) states (Decision 1056), then the source state of the given endpoint 900A is changed to quiet (Q) (Block 1058). This is basically a variation of rules that govern the behavior of an endpoint that is no longer active.

Figure 11B:
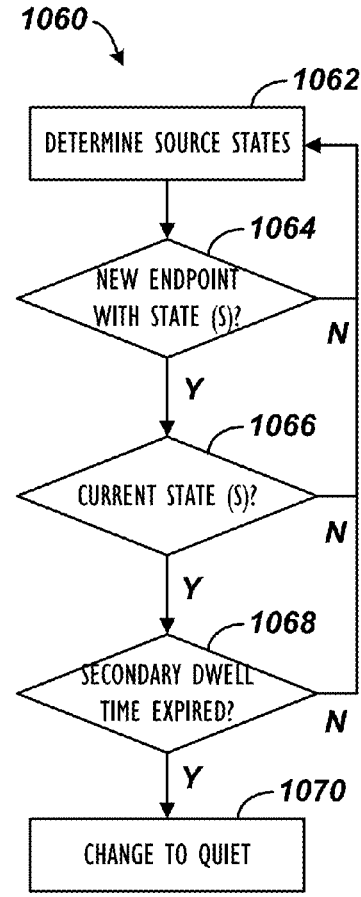

In another rule set 1060 of FIG. 11B, the source state of a given endpoint (e.g., 900A) and those of other endpoints (e.g., 900B-C) in the multipoint conference are determined (Block 1062). One of these other endpoints 900B-C may have a changed state. Accordingly, a determination is made whether one of the other endpoints (e.g., 900B) has a new Secondary source state (S) (Block 1064). If so, a check is made to see if the subject endpoint 900A also is in a Secondary state S (Decision 1066) and if its Secondary Dwell Time T2 has expired (Decision 1068). When both are true, then the source state of the given endpoint 900A is changed to the Quiet source state (S) so that it does not transmit audio at all (Block 1070).

Figure 11C:
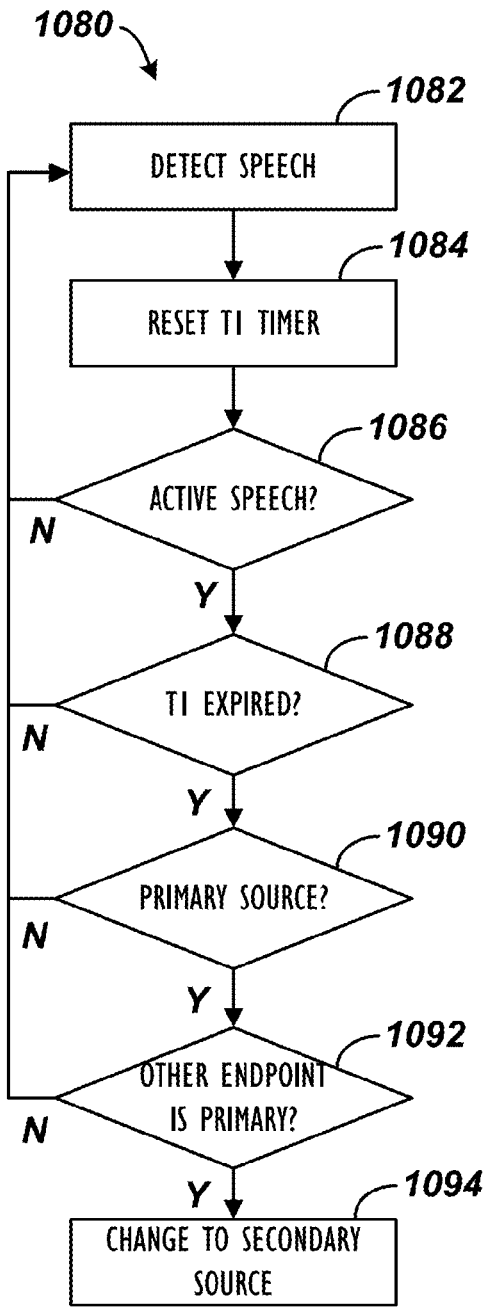
FIGS. 11C-11D show rules augmented by continuing to reset time intervals for so long as a given endpoint still has an active speech signal.
Figure 11D:
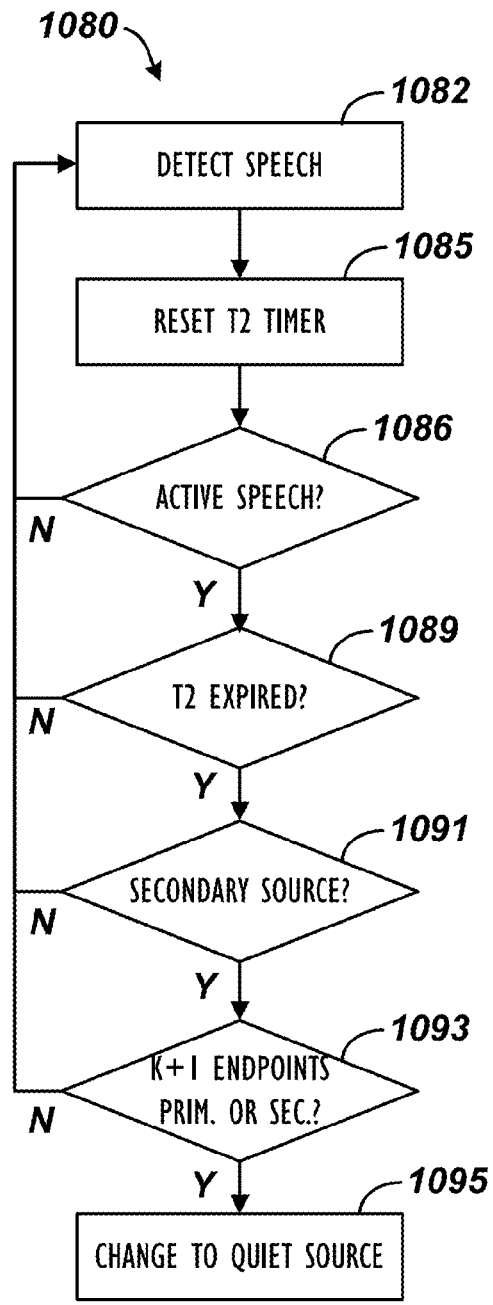

FIGS. 11C-11D show rule sets 1080 demonstrating how the previous rule sets 1040 and 1060 can be augmented by continuing to reset the Dwell Times T1 and T2 for so long as the given endpoint 900A still has an active speech signal. In both FIGS. 11C-11D, speech is detected for the given endpoint 900A (Block 1082), its timer is reset (Block 1084/ 1085), and arrival of active speech is awaited (Decision 1086). Eventually, the Dwell Times T1 and T2 expire without active speech detected (Decision 1088/1089).

As shown in FIG. 11C, when the given endpoint's Primary Dwell Time T1 expires (Decision 1088), the given endpoint's current state is Primary (P) (Decision 1090), and another endpoint is in the Primary state (P) (Block 1092), then the given endpoint enters a Secondary state S (Block 1094). That is, a primary talker reverts to a secondary talker after a predetermined time.

As shown in FIG. 11D, when the given endpoint's Secondary Dwell Time T2 expires (Decision 1089), the given endpoint's current state is Secondary (S), and there are more than a number of endpoints 900 in Primary States (P) or Secondary states (S) (Decision 1093), then the given endpoint 900 enters a Quiet state (Q) (Block 1095). In other words, if a secondary endpoint 900A has been a secondary endpoint for some period of time and there is a selected number of endpoints 900B-C also transmitting, the secondary endpoint 900A may enter the quiet state. This is so because only a certain amount of background is needed to provide a suitable conference environment. While having no secondary endpoints in the audio mix may provide an unnaturally sterile conference experience, having too many may not add to the experience and may in fact detract therefrom.

Figure 12A:
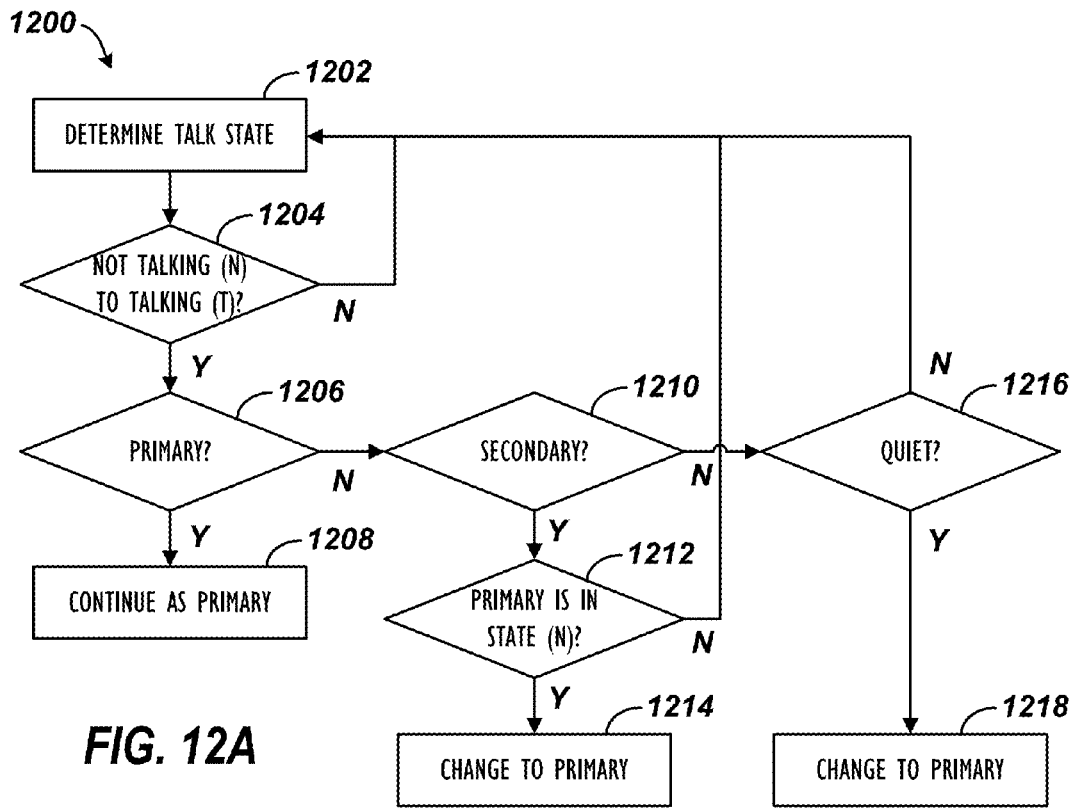
FIGS. 12A-12B show rules for when a given endpoint determines whether its talk state has changed so the endpoint can determine whether to change its source state or not
Figure 12B:
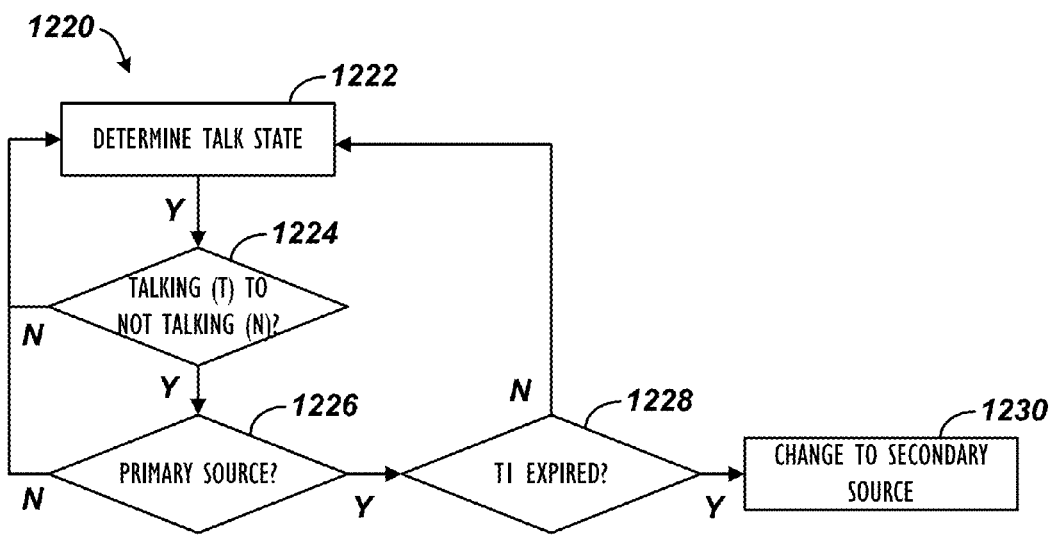

FIGS. 12A-12B show rule sets for when a given endpoint (e.g., 900A) changes its talk state so a determination can be made whether the source state of the endpoint 900A should be changed or not. In the rule set 1200 of FIG. 12A, the talk state of a given endpoint (e.g., 900A) is determined (Block 1202). In this instance, the rule set 1200 determines whether the given endpoint 900A has entered a Talking state (T) from a Not Talking state (N) (Decision 1204). If so, a first check is made whether the given endpoint's current source state is Primary (P) (Decision 1206) so the endpoint 900A can continue in the Primary state (P). In other words, a Primary (P) Talking (T) endpoint remains a Primary Talking endpoint for so long as the speaker is talking.

If not in a Primary state (P), another check is made whether the given endpoint's current source state is Secondary (S) (Decision 1210) and if the current primary source(s) are in a Not Talking state (N) (Block 1212). If so, the given endpoint 900A is changed from the Secondary state (S) to the Primary state (P), using the full bit rate. In other words, if the first (given) endpoint 900A is acting as a secondary (S) endpoint but has begun talking after a second endpoint 900B has stopped talking, then the first endpoint 900A becomes the primary talker (P, T).

If not in a Primary or Secondary state (P or S), a final check is made whether the given endpoint's current source state is Quiet (Q) (Decision 1216). If so, the endpoint 900A can directly enter the Primary state (P), using the full bit rate. Thus, if the given endpoint 900A had been quiet but has begun talking, then it becomes a Primary Talking endpoint.

In the rule set 1220 of FIG. 12B, the talk state of a given endpoint (e.g., 900A) is again determined (Block 1222). In this instance, the rule set 1220 determines whether the given endpoint 900A has entered a Not Talking state (N) from a Talking state (T) (Decision 1224). If so, a first check is made whether the given endpoint's current source state is Primary (P) (Decision 1226) and if its Primary Dwell time T1 has expired (Decision 1228) so the given endpoint 900A can enter a Secondary source state (S) (Block 1230). In other words, if the given endpoint 900A stops talking and a predetermined time has passed, then the endpoint 900A goes from a Primary Talker (P, T) to a Secondary Talker (S, T).

In a variation on the various rule sets discussed previously, the Quiet source state Q could be eliminated, and thus all endpoints 900A-C would remain in either a Primary source state (P) or a Secondary source state (S). In such a variation, either all sources 900A-C may be mixed to provide the overall signal, or the MCU 950 may select only certain signals for forwarding and subsequent mixing by the endpoints 900A-C.

Although several rule sets have been discussed above, it will be appreciated that these and other rules can be applied by the endpoints 900 and MCU 950 of a conference to reduce computational resources and conserve bandwidth based on the scalable audio techniques disclosed herein.

The scalable audio codec of the present disclosure has been described for use with a conferencing endpoint or terminal. However, the disclosed scalable audio codec can be used in various conferencing components, such as endpoints, terminals, routers, conferencing bridges, and others. In each of these, the disclosed scalable audio codec can save bandwidth, computation, and memory resources. Likewise, the disclosed audio codec can improve audio quality in terms of lower latency and less artifacts.

The techniques of the present disclosure can be implemented in digital electronic circuitry, or in computer hardware, firmware, software, or in combinations of these. Apparatus for practicing the disclosed techniques can be implemented in a computer program product tangibly embodied in a machine-readable storage device for execution by a programmable processor; and method steps of the disclosed techniques can be performed by a programmable processor executing a program of instructions to perform functions of the disclosed techniques by operating on input data and generating output. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A scalable audio processing method for a conference, the method comprising:
   determining a state of a first endpoint in the conference, the state indicative of the first endpoint being a primary source or a secondary source of conferencing audio;
   assessing the state by applying one or more rules to the state;
   processing audio for the conference with a scalable audio codec, wherein at least one parameter of the scalable audio codec is selected based on the assessed state of the first endpoint, wherein processing the audio with the scalable audio codec at least includes stripping bits from an encoded bit stream of the audio, the encoded bit stream having the bits adjustably arranged based on different frequency bands of the audio; and
   transmitting the processed audio for the conference.

2. The method of claim 1, wherein the processing and transmitting are implemented by a given endpoint receiving the encoded bit stream of the audio in the conference, the given endpoint including the first endpoint or a second endpoint in the conference, the processing and transmitting comprising at least one of:
   decoding the encoded bit stream into output audio and sending the output audio for output at the given endpoint; and
   stripping the bits from the encoded bit stream, decoding the stripped bit stream into the output audio, and sending the output audio for output at the given endpoint.

3. The method of claim 1, wherein the processing and transmitting are implemented by a given endpoint in the conference obtaining input audio at the given endpoint, the given endpoint including the first endpoint or a second endpoint in the conference, the processing and transmitting comprising at least one of:
   encoding the input audio into the encoded bit stream and sending the encoded bit stream via a network; and
   encoding the input audio in the encoded bit stream, stripping the bits from the encoded bit stream, and sending the stripped bit stream via the network.

4. The method of claim 1, wherein the processing and transmitting of the audio are implemented by a multipoint control unit in communication with a given endpoint in the conference via a network, the given endpoint including the first endpoint or a second endpoint, the processing and transmitting comprising at least one of:
   receiving the encoded bit stream of the audio via the network and relaying the encoded bit stream to the given endpoint via the network; and
   receiving the encoded bit stream of the audio via the network, stripping the bits from the encoded bit stream, and sending the stripped bit stream to the given endpoint via the network.

5. The method of claim 1, wherein the state is further indicative of the endpoint being a quiet source.

6. The method of claim 1, wherein processing the audio for the conference with the scalable audio codec comprises stripping the bits from the encoded bit stream of the audio using the scalable audio codec when the state of the first endpoint is indicative of a secondary source.

7. The method of claim 1, wherein the at least one parameter of the scalable audio codec comprises an indication of where to strip the bits in the encoded bit stream.

8. The method of claim 1, wherein assessing the state by applying one or more rules to the state comprises:
   changing the state from a primary source to a secondary source when (i) a first time interval of the first endpoint in the state has elapsed and (ii) a second endpoint in the conference has a state of a primary source; or
   changing the state from a secondary source to a quiet source when (i) a second time interval of the first endpoint in the state has elapsed and (ii) a second endpoint in the conference has a state of a secondary source.

9. The method of claim 1, wherein assessing the state by applying one or more rules to the state comprises:
   maintaining the state of a primary source when the first endpoint changes from not having speech audio to having speech audio;
   changing the state from a secondary source to a primary source when (i) the first endpoint changes from not having speech audio to having speech audio and (ii) a second endpoint in the conference has a state of a primary source and does not have speech audio; or
   changing the state from a quiet source to a primary source when the first endpoint changes from not having speech audio to having speech audio.

10. The method of claim 1, wherein assessing the state by applying one or more rules to the state comprises:
    changing the state from a primary source to a secondary source when (i) the first endpoint changes from having speech audio to not having speech audio and (ii) a first time interval of the first endpoint in the state has elapsed; or
    changing the state from a secondary source to a quiet source when (i) the first endpoint changes from having speech audio to not having speech audio and (ii) a second time interval of the first endpoint in the state has elapsed.

11. The method of claim 1, wherein determining the state of the first endpoint comprises detecting a presence of speech in audio of the first endpoint, wherein the state is further indicative of the first endpoint having speech audio or not having speech audio.

12. The method of claim 1, further comprising determining, after determining the state, that a time interval associated with the state has elapsed, wherein assessing the state is performed at least after the time interval has elapsed.

13. The method of claim 12, wherein the time interval associated with the state comprises separate time intervals for the state of primary source and the state of secondary source.

14. The method of claim 1, wherein processing the audio with the scalable audio codec comprises:
    transform coding the different frequency bands of the audio into different sets of transform coefficients; and
    packetizing the different sets of transform coefficients.

15. The method of claim 14, wherein the at least one parameter of the scalable audio codec comprise a plurality of bit allocations allocated for the different frequency bands.

16. The method of claim 15, wherein packetizing comprises packetizing the different sets of transform coefficients with the corresponding bit allocations, whereby the encoded bit stream has the bits adjustably allocated into the different frequency bands based on the corresponding bit allocations.

17. The method of claim 15, wherein the bit allocations associated with the assessed state for the primary source emphasize lower frequencies of the different frequency bands.

18. The method of claim 15, wherein the bit allocations associated with the assessed state for the secondary source deemphasizes higher frequencies of the different frequency bands.

19. The method of claim 14, wherein the at least one parameter of the scalable audio codec comprise frequency regions of the different frequency bands in which the transform coefficients are arranged, and wherein packetizing comprises packetizing the different sets of transform coefficients based on an ordered importance of the frequency regions, whereby the encoded bit stream has the bits adjustably ordered into the frequency regions based on the ordered importance.

20. The method of claim 19, wherein the ordered importance of the frequency regions emphasizes frequency regions with greater energy levels or lower frequencies.

21. A programmable storage device having program instructions stored thereon for causing a programmable control device to perform a scalable audio processing method, the method comrpising:
   determining a state of a first endpoint in the conference, the state indicative of the first endpoint being a primary source or a secondary source of conferencing audio;
   assessing the state by applying one or more rules to the state;
   processing audio for the conference with a scalable audio codec, wherein at least one parameter of the scalabel audio codec is selected based on the assessed state of the first endpoint, wherein processing the audio with the scalable audio codec at least includes stripping bits from encoded bit stream of the audio, the encoded bit stream having the bits adjustably arranged based on different frequency bands of the audio: and transmitting the processed audio for the conference.

22. A processing device, comprising:
   a network interface; and
   a processor communicatively coupled to the network interface and obtaining audio signals, the processor having a scalable audio codec and configured to:
     determine a state of a first audio device in a distributed audio network, the state indicative of the first audio device being a primary source or a secondary source of network audio,
     apply one or more rules to assess the state,
     process audio for the distributed audio network with the scalable audio codec, wherein at least one parameter of the scalable audio codec is selected based on the assessed state of the first audio device, wherein to process the audio with the scalable audio codec, the processor is at least configured to strip bits from an encoded bit stream of the audio, the encoded bit stream having the bits adjustably arranged based on different frequency bands of the audio, and
     transmit the processed audio for the distributed audio network.

23. The processing device of claim 22, wherein the processing device comprises one of: the first audio device for which the state is determined, a multipoint control unit in the distributed audio network, or a second audio device in the distributed audio network.

24. The processing device of claim 22, wherein the distributed audio network comprises a multipoint conference; and wherein the first audio device comprises a first endpoint of the multipoint conference.

25. A scalable audio processing method, comprising:
   determining a state of a first audio device in a distributed audio network, the state indicative of the first audio device being a primary source or a secondary source of network audio;
   assessing the state by applying one or more rules to the state;
   processing audio for the distributed audio network with a scalable audio codec,
     wherein at least one parameter of the scalable audio codec is selected based on the assessed state of the first audio device, wherein processing the audio with the scalable audio codec at least includes stripping bits from an encoded bit stream of the audio, the encoded bit stream having the bits adjustably arranged based on different frequency bands of the audio; and
   transmitting the processed audio for the distributed audio network.

26. The programmable storage device of claim 21, wherein the processing and transmitting are implemented by a given endpoint receiving the encoded bit stream of the audio in the conference, the given endpoint including the first endpoint or a second endpoint in the conference; and wherein the processing and transmitting comprise at least one of:
   decoding the encoded bit stream into output audio and sending the output audio for output at the given endpoint; and
   stripping the bits from the encoded bit stream, decoding the stripped bit stream into the output audio, and sending the output audio for output at the given endpoint.

27. The programmable storage device of claim 21, wherein the processing and transmitting are implemented by a given endpoint in the conference obtaining input audio at the given endpoint, the given endpoint including the first endpoint or a second endpoint in the conference; and wherein the processing and transmitting comprise at least one of:
   encoding the input audio into the encoded bit stream and sending the encoded bit stream via a network; and
   encoding the input audio in the encoded bit stream, stripping the bits from the encoded bit stream, and sending the stripped bit stream via the network.

28. The programmable storage device of claim 21, wherein the processing and transmitting of the audio are implemented by a multipoint control unit in communication with a given endpoint in the conference via a network, the given endpoint including the first endpoint or a second endpoint; and wherein the processing and transmitting comprise at least one of:
   receiving the encoded bit stream of the audio via the network and relaying the encoded bit stream to the given endpoint via the network; and
   receiving the encoded bit stream of the audio via the network, stripping the bits from the encoded bit stream, and sending the stripped bit stream to the given endpoint via the network.

29. The programmable storage device of claim 21, wherein processing the audio for the conference with the scalable audio codec comprises stripping the bits from the encoded bit stream of the audio using the scalable audio codec when the state of the first endpoint is indicative of a secondary source.

30. The programmable storage device of claim 21, wherein the at least one parameter of the scalable audio codec comprises an indication of where to strip the bits in the encoded bit stream.

31. The programmable storage device of claim 21, wherein assessing the state by applying one or more rules to the state comprises:
    changing the state from a primary source to a secondary source when (i) a first time interval of the first endpoint in the state has elapsed and (ii) a second endpoint in the conference has a state of a primary source;
    changing the state from a secondary source to a quiet source when (i) a second time interval of the first endpoint in the state has elapsed and (ii) a second endpoint in the conference has a state of a secondary source;
    maintaining the state of a primary source when the first endpoint changes from not having speech audio to having speech audio;
    changing the state from a secondary source to a primary source when (i) the first endpoint changes from not having speech audio to having speech audio and (ii) a second endpoint in the conference has a state of a primary source and does not have speech audio;
    changing the state from a quiet source to a primary source when the first endpoint changes from not having speech audio to having speech audio;
    changing the state from a primary source to a secondary source when (i) the first endpoint changes from having speech audio to not having speech audio and (ii) a first time interval of the first endpoint in the state has elapsed; or
    changing the state from a secondary source to a quiet source when (i) the first endpoint changes from having speech audio to not having speech audio and (ii) a second time interval of the first endpoint in the state has elapsed.

32. The programmable storage device of claim 21, wherein determining the state of the first endpoint comprises detecting a presence of speech in audio of the first endpoint, wherein the state is further indicative of the first endpoint having speech audio or not having speech audio.

33. The programmable storage device of claim 21, wherein processing the audio with the scalable audio codec comprises:
    transform coding the different frequency bands of the audio into different sets of transform coefficients; and
    packetizing the different sets of transform coefficients.

34. The programmable storage device of claim 33, wherein the at least one parameter of the scalable audio codec comprise a plurality of bit allocations allocated for the different frequency bands.

35. The programmable storage device of claim 34, wherein packetizing comprises packetizing the different sets of transform coefficients with the corresponding bit allocations, whereby the encoded bit stream has the bits adjustably allocated into the different frequency bands based on the corresponding bit allocations.

36. The programmable storage device of claim 34, wherein the bit allocations associated with the assessed state for the primary source emphasize lower frequencies of the different frequency bands; and wherein the bit allocations associated with the assessed state for the secondary source deemphasize higher frequencies of the different frequency bands.

37. The programmable storage device of claim 33, wherein the at least one parameter of the scalable audio codec comprise frequency regions of the different frequency bands in which the transform coefficients are arranged, and wherein packetizing comprises packetizing the different sets of transform coefficients based on an ordered importance of the frequency regions, whereby the encoded bit stream has the bits adjustably ordered into the frequency regions based on the ordered importance.

38. The device of claim 22, wherein the processing device receives the encoded bit stream; and wherein to process and transmit, the processor is configured to at least one of:
    decode the encoded bit stream into output audio and send the output audio for output; and
    strip the bits from the encoded bit stream, decode the stripped bit stream into the output audio, and send the output audio for output.

39. The device of claim 22, wherein the processing device obtains the audio as input audio; and wherein to process and transmit, the processor is configured to at least one of:
    encode the input audio into the encoded bit stream and send the encoded bit stream via the distributed audio network; and
    encode the input audio in the encoded bit stream, strip the bits from the encoded bit stream, and send the stripped bit stream via the distributed audio network.

40. The device of claim 22, wherein to process and transmit, the processor is configured to at least one of:
    receive the encoded bit stream of the audio via the distributed audio network and relay the encoded bit stream via the distributed audio network; and
    receive the encoded bit stream of the audio via the distributed audio network, strip the bits from the encoded bit stream, and send the stripped bit stream via the distributed audio network.

41. The device of claim 22, wherein to process the audio for the distributed audio with the scalable audio codec, the processor is configured to strip the bits from the encoded bit stream of the audio using the scalable audio codec when the state of the first audio device is indicative of a secondary source.

42. The device of claim 22, wherein the at least one parameter of the scalable audio codec comprises an indication of where to strip the bits in the encoded bit stream.

43. The device of claim 22, wherein to apply one or more rules to assess the state, the processor is configured to:
    change the state from a primary source to a secondary source when (i) a first time interval of the first audio device in the state has elapsed and (ii) a second audio device in the conference has a state of a primary source;
    change the state from a secondary source to a quiet source when (i) a second time interval of the first audio device in the state has elapsed and (ii) a second audio device in the conference has a state of a secondary source;
    maintain the state of a primary source when the first endpoint changes from not having speech audio to having speech audio;
    change the state from a secondary source to a primary source when (i) the first audio device changes from not having speech audio to having speech audio and (ii) a second audio device in the conference has a state of a primary source and does not have speech audio;
    change the state from a quiet source to a primary source when the first audio device changes from not having speech audio to having speech audio;
    change the state from a primary source to a secondary source when (i) the first audio device changes from having speech audio to not having speech audio and (ii) a first time interval of the first audio device in the state has elapsed; or change the state from a secondary source to a quiet source when (i) the first audio device changes from having speech audio to not having speech audio and (ii) a second time interval of the first endpoint in the state has elapsed.

44. The device of claim 22, wherein to determine the state of the first audio device, the processor is configured to detect a presence of speech in the audio of the first audio device, wherein the state is further indicative of the first audio device having speech audio or not having speech audio.

45. The device of claim 22, wherein to process the audio with the scalable audio codec, the processor is configured to:
   transform code the different frequency bands of the audio into different sets of transform coefficients; and
   packetize the different sets of transform coefficients.

46. The device of claim 45, wherein the at least one parameter of the scalable audio codec comprise a plurality of bit allocations allocated for the different frequency bands.

47. The device of claim 46, wherein to packetize, the processor is configured to packetize the different sets of transform coefficients with the corresponding bit allocations, whereby the encoded bit stream has the bits adjustably allocated into the different frequency bands based on the corresponding bit allocations.

48. The device of claim 46, wherein the bit allocations associated with the assessed state for the primary source emphasize lower frequencies of the different frequency bands; and wherein the bit allocations associated with the assessed state for the secondary source deemphasize higher frequencies of the different frequency bands.

49. The device of claim 45, wherein the at least one parameter of the scalable audio codec comprise frequency regions of the different frequency bands in which the transform coefficients are arranged, and wherein to packetize, the processor is configured to packetize the different sets of transform coefficients based on an ordered importance of the frequency regions, whereby the encoded bit stream has the bits adjustably ordered into the frequency regions based on the ordered importance.

* * * * *